(12) United States Patent
Bae et al.

(10) Patent No.: US 11,715,063 B1
(45) Date of Patent: Aug. 1, 2023

(54) APPARATUS AND METHOD FOR PROVIDING INTEGRATED LOGISTICS PRODUCTS MANAGEMENT SERVICE TO PROVIDE ELECTRONIC SHIPMENT CERTIFICATE

(71) Applicant: WILLOG CO., LTD., Seoul (KR)

(72) Inventors: Sung Hoon Bae, Seoul (KR); Ji Hyun Yun, Pyeongtaek-si (KR)

(73) Assignee: WILLOG CO., LTD., Seoul (KR)

( * ) Notice: Subject to any disclaimer, the term of this patent is extended or adjusted under 35 U.S.C. 154(b) by 0 days.

(21) Appl. No.: 17/820,627

(22) Filed: Aug. 18, 2022

(30) Foreign Application Priority Data

Feb. 3, 2022 (KR) .......................... 10-2022-0013912

(51) Int. Cl.
*G06Q 10/00* (2023.01)
*G06Q 10/087* (2023.01)
*G06Q 10/0832* (2023.01)
*G06Q 10/0833* (2023.01)

(52) U.S. Cl.
CPC ....... *G06Q 10/087* (2013.01); *G06Q 10/0832* (2013.01); *G06Q 10/0833* (2013.01)

(58) Field of Classification Search
CPC ............. G06Q 10/087; G06Q 10/0832; G06Q 10/0833
USPC ....................................................... 705/28
See application file for complete search history.

(56) References Cited

U.S. PATENT DOCUMENTS 11,321,652 B1 * 5/2022 Mahmood ........ G06Q 10/06316

FOREIGN PATENT DOCUMENTS

| CN | 113632434 A | * | 11/2021 | ......... G06F 16/1824 |
|---|---|---|---|---|
| JP | 2022151311 A | * | 10/2022 | |
| KR | 10-1521633 B1 | | 5/2015 | |
| KR | 10-1872698 B1 | | 6/2018 | |
| KR | 10-2309261 B1 | | 10/2021 | |

OTHER PUBLICATIONS

An Office Action mailed by Korean Intellectual Property Office dated Jul. 26, 2022, which corresponds to Korean Patent Application No. 10-2022-0013912; with English language translation.

* cited by examiner

*Primary Examiner* — Russell S Glass
(74) *Attorney, Agent, or Firm* — Studebaker & Brackett PC

(57) ABSTRACT

The present disclosure relates to a method for providing an electronic shipment certificate performed by a server providing an integrated logistics products management service. The method includes operations of: obtaining a digital code including shipment information generated during a shipment process of a logistics product; obtaining a QR code generated through a device for measuring a delivery state during the delivery process of the logistics product; linking shipment information and shipment state information on the logistics product on the basis of the digital code and the QR code; and providing the shipment information on the logistics product through an external terminal on the basis of the QR code displayed on a screen of an apparatus. The QR code includes sensing data measuring at least one among temperature, acceleration, humidity, illumination, inclination, impact, and location through a sensor of the apparatus during the delivery process of the logistics product.

17 Claims, 9 Drawing Sheets

APPARATUS AND METHOD FOR PROVIDING INTEGRATED LOGISTICS PRODUCTS MANAGEMENT SERVICE TO PROVIDE ELECTRONIC SHIPMENT CERTIFICATE

CROSS-REFERENCE TO RELATED APPLICATION

A claim for priority under 35 U.S.C. § 119 is made to Korean Patent Application No. 10-2022-0013912 filed on Feb. 3, 2022 in the Korean Intellectual Property Office, the entire contents of which are hereby incorporated by reference.

BACKGROUND

1. Technical Field

The present disclosure relates to an apparatus and a method for providing an integrated logistics products management service to provide an electronic shipment certificate.

2. Description of Related Art

Recently, buying things online has been a growing trend among people, and logistics products delivery is on the increase as the development of transportation businesses facilitates long distance transportation. Additionally, the delivery of vaccines is an issue of growing importance due to COVID-19.

In general, there is often a problem in which logistics products being transported are damaged or go bad due to temperature, humidity and impact while being distributed. Thus, logistics products of an acceptable level of quality may not be delivered to clients.

Therefore, a person carrying logistics products directly may need to check current state information, such as temperature, humidity and impact, in a delivery vehicle, to determine the state of the logistics products, and complete a paper certificate, such as company documents or an inspection report including the state information, and provide the certificate to a client or a manager.

However, it is substantially difficult to precisely grasp the state of logistics products in a delivery vehicle and to arrange the state of logistics products, since the amount of deliveries of logistics products, including vaccines, has rapidly increased.

Moreover, in a case in which biological agents are being transported, a delivery person must install an automatic temperature recording device in the vehicle or inside a transportation container and a thermometer (outside the transportation container), in order to verify whether or not a correct temperature is maintained during transportation, and maintain a record of temperatures measured during transport for up to two years.

Therefore, there is a need for a method in which a person carrying logistics products can directly transmit state information of the logistics products in the delivery vehicle to a manager or a client without manually completing a certificate. Furthermore, there is a need for an electronic and automated data integration method for efficiently storing and managing a large amount of information and a large amount of paper certificates generated during transport.

SUMMARY

The present disclosure has been made to solve the above-mentioned problems occurring in the prior art, and in an aspect of the present disclosure, an object is to provide logistics products state information in the form of a QR code by sensing at least one among temperature, acceleration, humidity, illumination, slope, impact, location, and the like inside a delivery vehicle to deliver logistics products.

Another object is to integrate logistics products data and provide the logistics products data in the form of an electronic document using the QR code generated during logistics products delivery.

The aspects of the present disclosure are not limited to those mentioned above, and other aspects not mentioned herein will be clearly understood by those skilled in the art from the following description.

Besides the above, a computer program stored in a computer readable recording medium for embodying the present disclosure may be additionally provided.

Besides the above, a computer readable recording medium to record computer programs for executing the method may be additionally provided.

DETAILED DESCRIPTION

Figure 1:
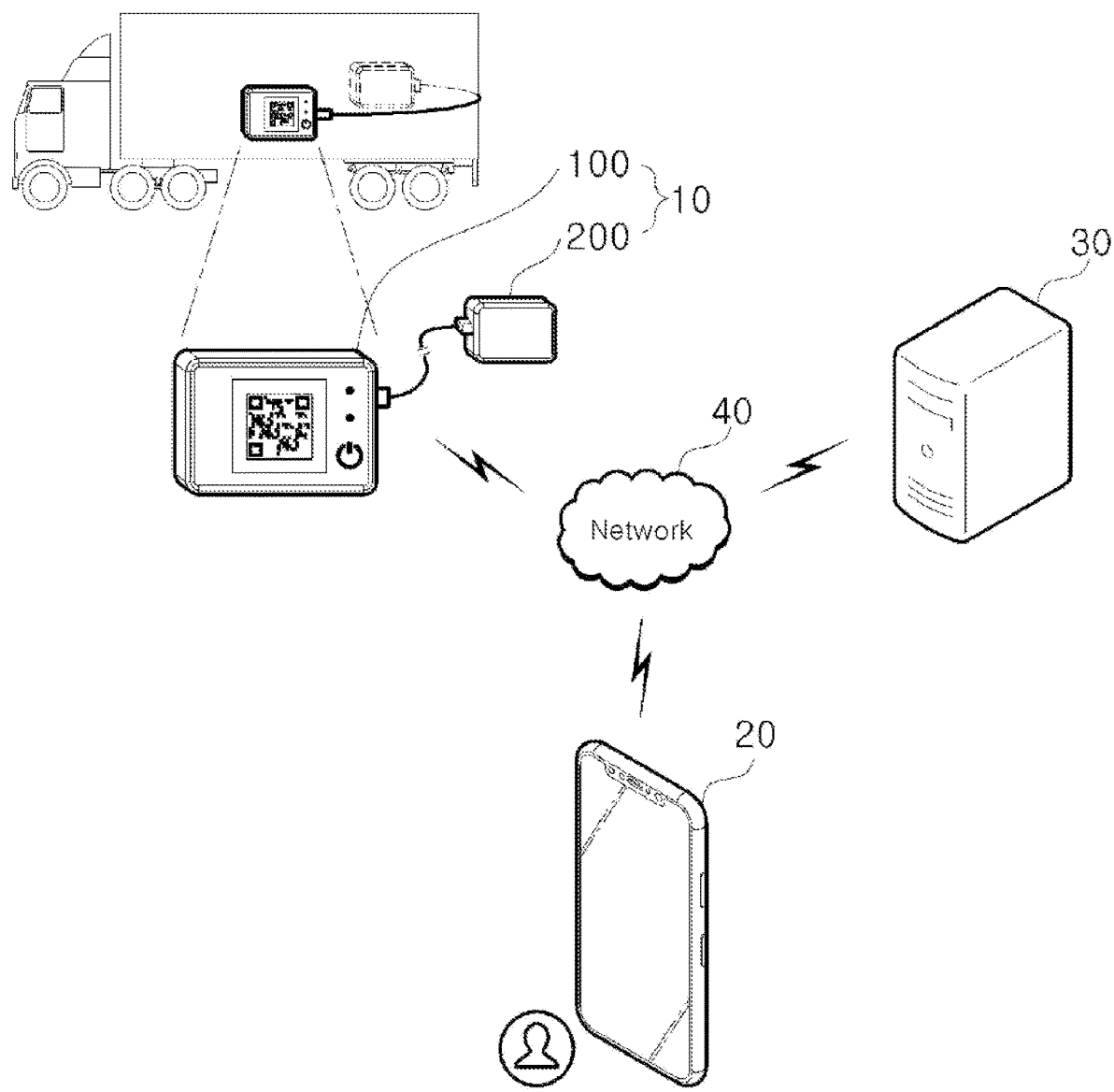
FIG. 1 is a schematic diagram of a system 1 for providing an integrated logistics products management service according to the present disclosure.

Advantages and features of the present disclosure and methods accomplishing the advantages and features will become apparent from the following detailed description of exemplary embodiments with reference to the accompanying drawings. However, the present disclosure is not limited to exemplary embodiment disclosed herein but will be implemented in various forms. The exemplary embodiments are provided so that the present disclosure is completely disclosed, and a person of ordinary skill in the art can fully understand the scope of the present disclosure. Therefore, the present disclosure will be defined only by the scope of the appended claims.

Terms used in the specification are used to describe specific embodiments of the present disclosure and are not intended to limit the scope of the present disclosure. In the specification, the terms of a singular form may include plural forms unless otherwise specified. It should be also understood that the terms of 'include' or 'have' in the specification are used to mean that there is no intent to exclude existence or addition of other components besides components described in the specification. In the detailed description, the same reference numbers of the drawings refer to the same or equivalent parts of the present disclosure, and the term "and/or" is understood to include a combination of one or more of components described above. It will be understood that terms, such as "first" or "second" may be used in the specification to describe various components but are not restricted to the above terms. The terms may be used to discriminate one component from another component. Therefore, of course, the first component may be named as the second component within the scope of the present disclosure.

Unless otherwise defined, all terms (including technical and scientific terms) used herein have the same meaning as commonly understood by those skilled in the technical field to which the present disclosure pertains. It will be further understood that terms, such as those defined in commonly used dictionaries, should not be interpreted in an idealized or overly formal sense unless expressly so defined herein.

In the drawings, like reference numerals designate like components. This disclosure does not describe all components of embodiments, and general contents in the technical field to which the present disclosure belongs or repeated contents of the embodiments will be omitted. The terms, such as "unit, module, member, and block" may be embodied as hardware or software, and a plurality of "units, modules, members, and blocks" may be implemented as one component, or a unit, a module, a member, or a block may include a plurality of components.

Throughout this specification, when a part is referred to as being "connected" to another part, this includes "direct connection" and "indirect connection", and the indirect connection may include connection via a wireless communication network. Furthermore, when a certain part "includes" a certain component, other components are not excluded unless explicitly described otherwise, and other components may in fact be included.

In the entire specification of the present disclosure, when any member is located "on" another member, this includes a case in which still another member is prevent between both members as well as a case in which one member is in contact with another member.

Identification codes in each operation are used not for describing the order of the operations but for convenience of description, and the operations may be implemented differently from the order described unless there is a specific order explicitly described in the context.

Hereinafter, activation in the present disclosure means a state in which at least one among an apparatus 10, which will be described hereinafter, a first sensor 200, and a second sensor 120 included in the apparatus 10 is turned on, and deactivation means a state in which the device is turned off or a specific operation, for instance, a sensing operation, is on pause while the device is turned on. In this instance, in the deactivation state of the device, when the device is reactivated, the specific operation may restart.

Hereinafter, operation principles and embodiments of the present disclosure will be described with reference to the accompanying drawings.

FIG. 1 is a schematic diagram of a system 1 for providing an integrated logistics products management service according to the present disclosure.

Figure 2:
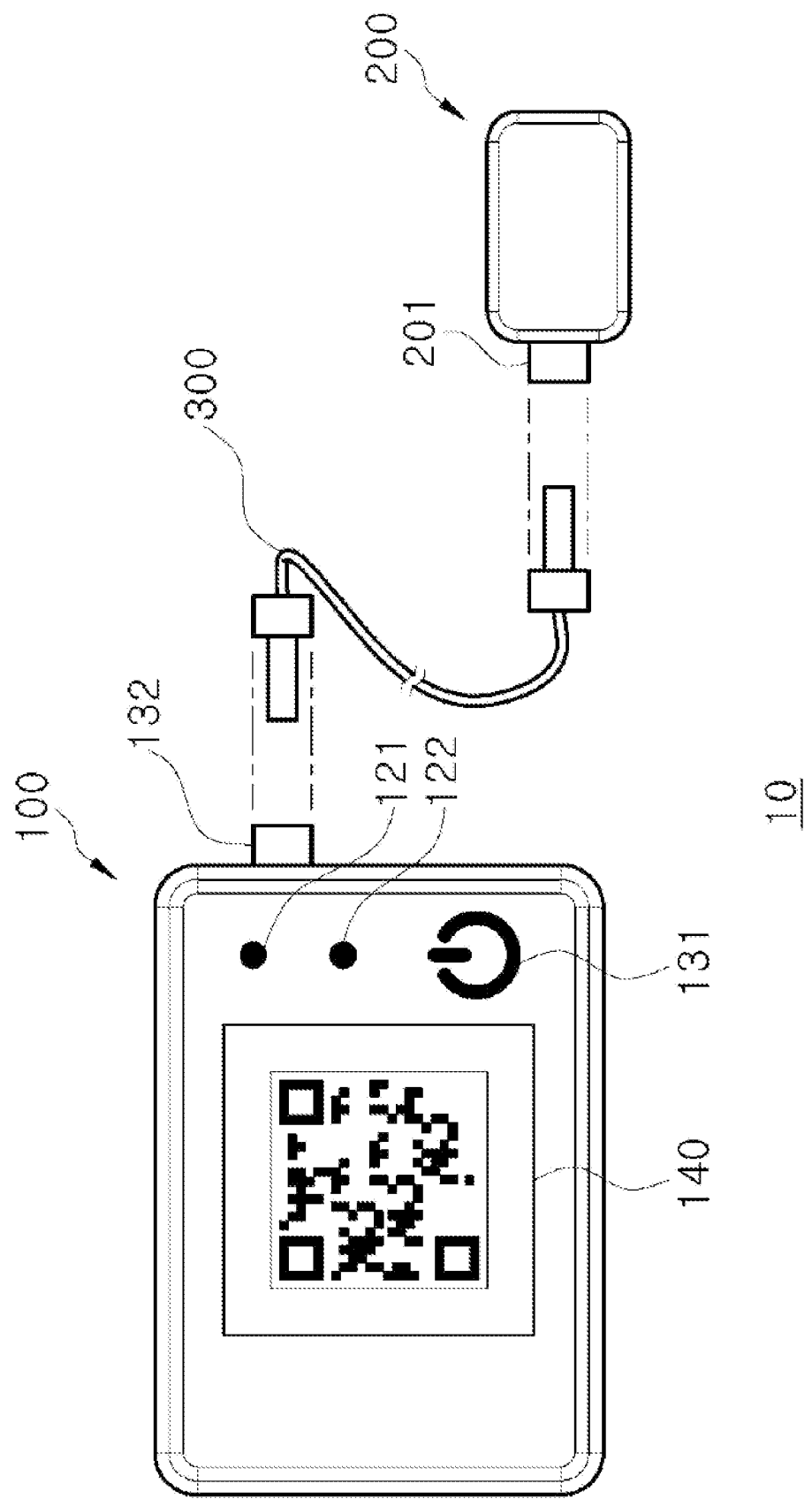
FIGS. 2 to 3 illustrate an apparatus 10 for generating and storing sensing data used in state management of logistics products according to the present disclosure.
Figure 3:
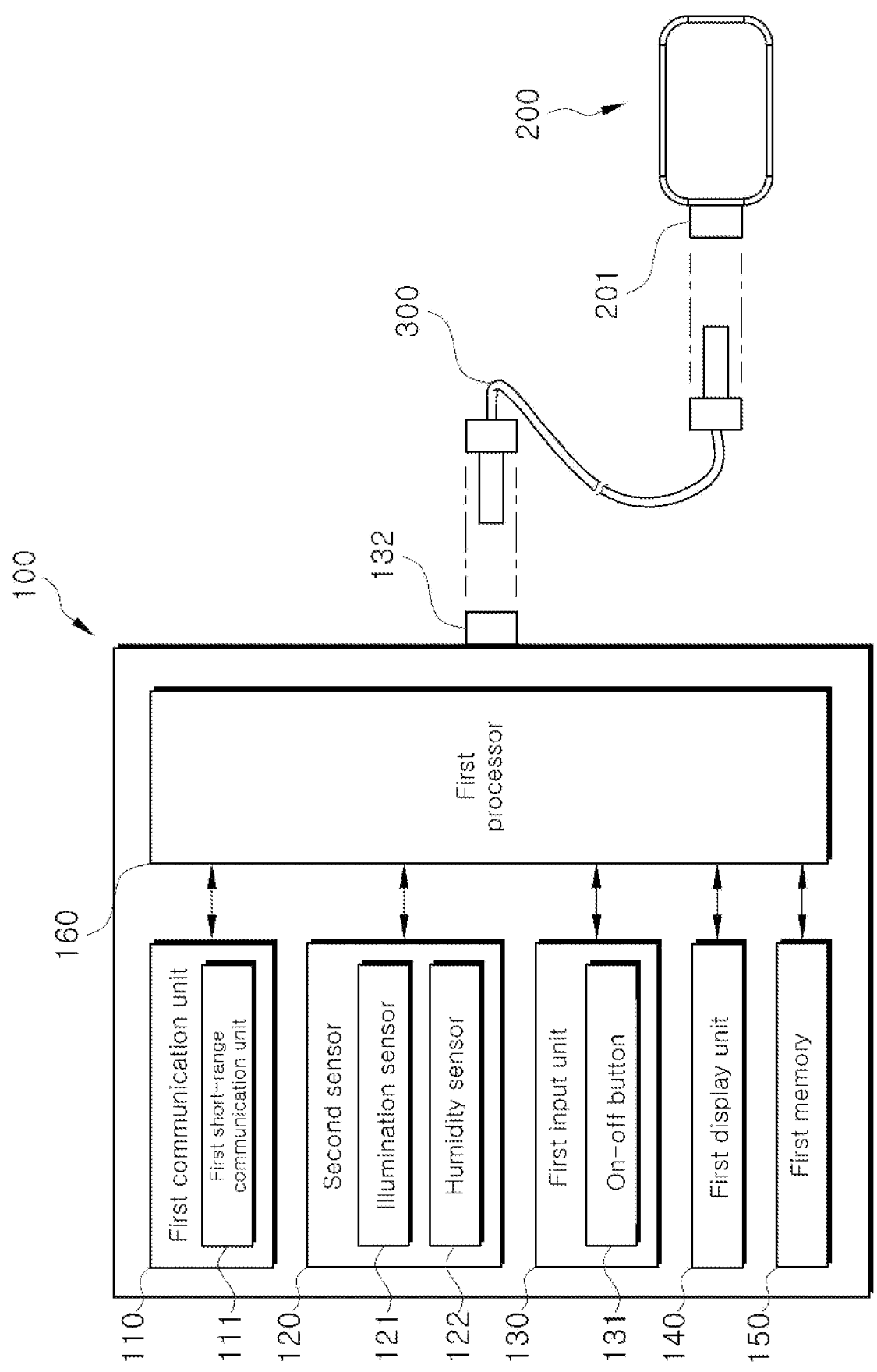

FIGS. 2 to 3 illustrate an apparatus 10 for generating and storing sensing data used in condition management of logistics products according to the present disclosure.

Figure 4:
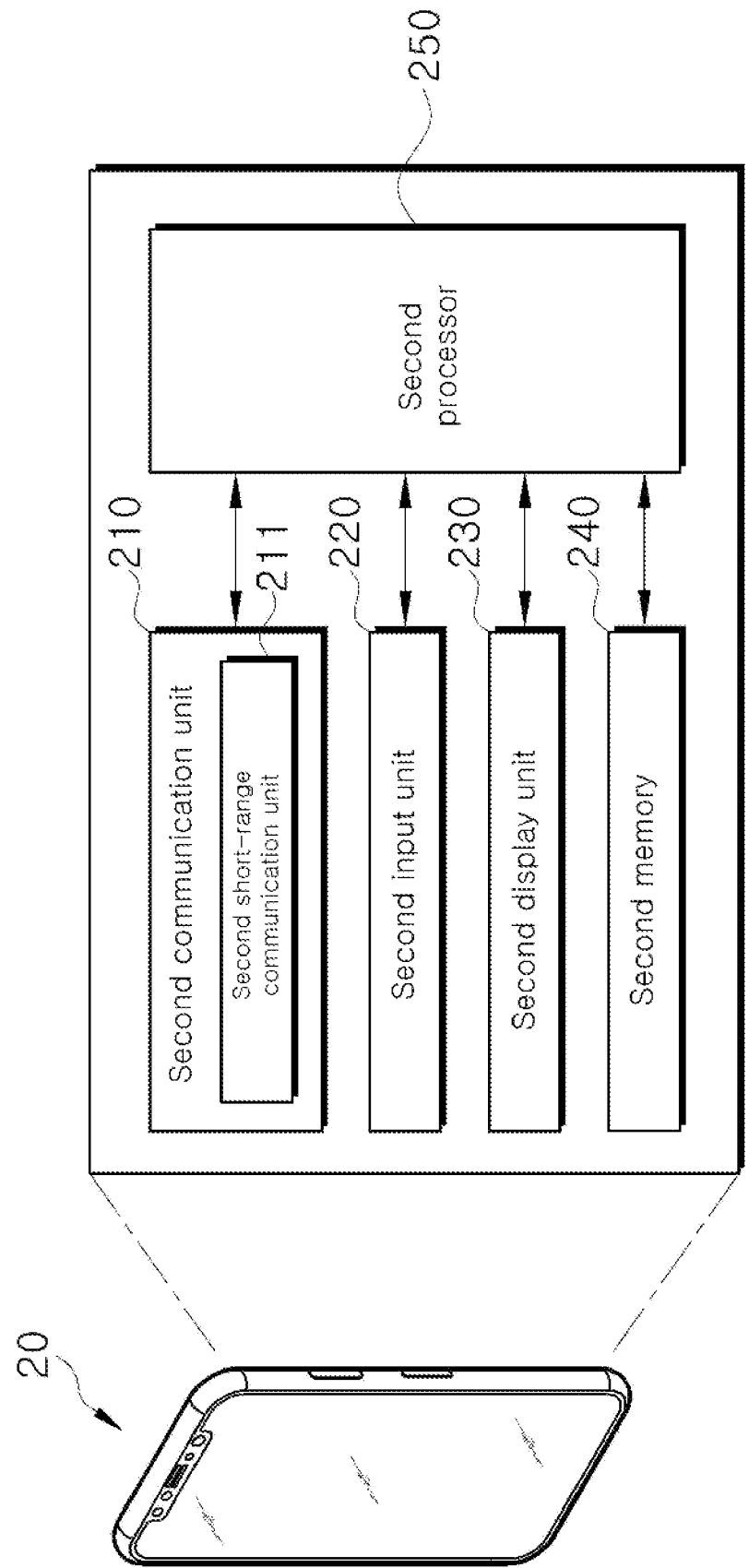
FIG. 4 is a diagram illustrating an external terminal 20 according to the present disclosure.

FIG. 4 is a diagram illustrating an external terminal 20 according to the present disclosure.

Figure 5:
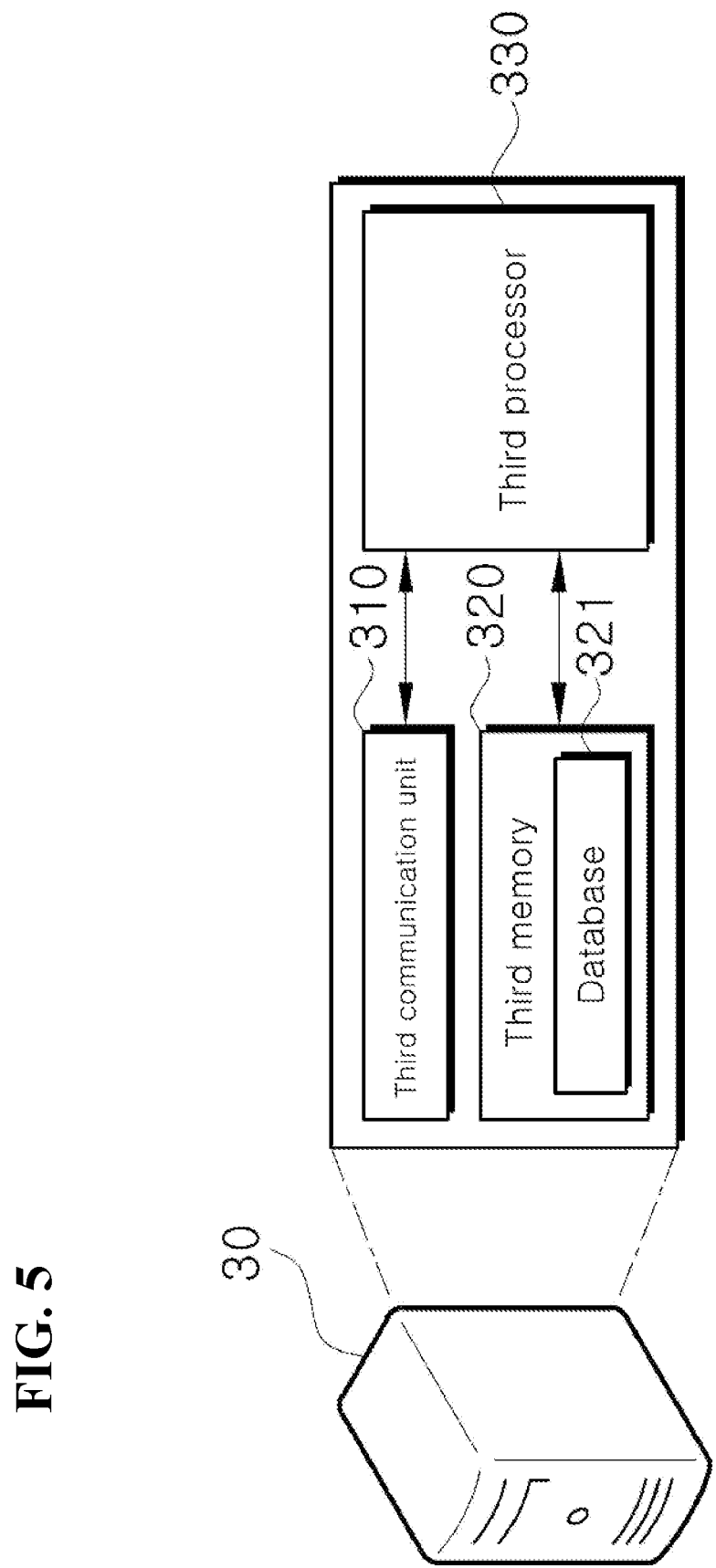
FIG. 5 is a diagram illustrating a server 30 according to the present disclosure.

FIG. 5 is a diagram illustrating a server 30 according to the present disclosure.

Hereinafter, referring to FIGS. 1 to 5, a system 1 for providing an integrated logistics products management service according to the present disclosure will be described. Here, the system 1 may include a larger or smaller number of components than those shown in FIG. 1.

The system 1 includes: an apparatus 10 for measuring the state of logistics products; a terminal 20 for recognizing a two-dimensional code, for instance, a QR code, provided by the apparatus 10; a server 30 for providing an integrated logistics products management service by using information represented by the two-dimensional code through decoding of the two-dimensional code received from the terminal; a communication network 40; and an external server (not shown).

The system 1 senses at least one among temperature, acceleration, humidity, illumination, inclination, impact, and location in an area 3 on which the logistics products of a delivery vehicle 2 for delivering the logistics products are loaded, and provides the state information of the logistics products in the form of a QR code. Thus, in a case in which a user has the external terminal 20 and an application capable of recognizing the QR code, the system 1 can easily and accurately confirm the state of logistics products in the delivery vehicle 2 by easily recognizing the QR code through the external terminal 20 without a complicated process so as to take necessary measures.

Here, the state information includes at least one among temperature, humidity, and illumination for keeping logistics products in an appropriate environment, a slope for loading the logistics products so that contents of the logistics products do not spill or flow out, impact applied to logistics products which may be fragile, like glass, and a delivery location of the logistics products. State information necessary for keeping or delivering the corresponding logistics products is set in advance. For instance, assuming of milk contained in a bottle, the status information of the logistics products may be, for example, a change in temperature or humidity for preventing milk from going bad, or intensity of impact to prevent the bottle from being broken. Preferably, the status information of the logistics products includes location information indicating the location of the logistics products so as to accurately and quickly notify a seller and a purchaser of transfer location of the logistics products managed by the manager or purchased by the buyer.

In addition, the system 1 can simplify a procedure of confirming the state of the delivery vehicle, thereby enabling an integrated logistics products state management service to enhance efficiency, and minimizing the issuance of a number of paper certificates, such as authentication documents or examination reports which have to be submitted every time during distribution processes.

In addition, in a case in which the delivery vehicle 2 is scraped or altered in the usage purpose, the apparatus 10 is recyclable, thereby reducing waste of the apparatus 10 and reducing costs.

First, the apparatus 10 will be described with reference to FIGS. 2 and 3. The apparatus 10 may have the shape illustrated in FIG. 2.

The apparatus 10 senses at least one among temperature, acceleration, humidity, illumination, slope, impact, and location within an area 3 on which the logistics products of the delivery vehicle 2 is loaded. The apparatus 10 generates state information of the logistics products based on the sensing result, and generate and display a QR code representing the generated state information.

Here, the logistics products may be articles to be delivered, or may be articles to be protected from deformation, temperature change, external impact, etc. during a delivery process. In addition, the logistics products in the present disclosure may be referred to transported articles, delivered articles, or delivered products. For example, the logistics products may be medicine and medical supplies, biological products, fresh food, or the like.

Accordingly, the apparatus 10 displays the QR code representing the state information, and the external terminal 20 reads the QR code to easily confirm the state information.

Here, the apparatus 10 is detachable. So, even in the case that the apparatus 10 is attached to the area 3 on which the logistics products of the delivery vehicle 2 is loaded, in a case in which the delivery vehicle 2 is scraped or altered in the usage purpose, the apparatus 10 are collected from the area 3 and are recyclable. Here, the area 3 on which the logistics products of the delivery vehicle 2 is loaded may be a container box integrally provided with the delivery vehicle 2, or a separable container box.

FIG. 1 illustrates that one apparatus 10 is installed in the area 3 on which the logistics products of one delivery vehicle 2 is loaded, but the device is not limited thereto, but a plurality of devices may be installed in the area 3. That is, the device can be attached and detached at any region of the area 3. Alternatively, the apparatus 10 may be installed in the form of being detachably attached to all delivery articles, or may be installed in the form of being detachably attached to a box containing a plurality of delivery articles.

The apparatus 10 includes a main body 100 and a first sensor 200. Specifically, the main body 100 of the apparatus 10 is detachably attached to the outside of the area 3 in which logistics products of the delivery vehicle 2 are loaded, and the first sensor 200 of the apparatus 10 is detachably attached to the inside of the area 3 on which logistics products of the delivery vehicle 2 are loaded.

First, at least one first sensor 200 of the apparatus 10 is mounted inside the area 3, and senses at least one among temperature, acceleration, humidity, illumination, slope, impact, and location inside the area 3.

Here, the first sensor 200 senses environment information around the area 3 and generates a sensing signal corresponding thereto. The first processor 160 controls the operation of the first sensor 200 of the apparatus 10 based on the sensing signal, or performs data processing, function, or operation related to an application program installed in the apparatus 10.

For example, the first sensor 200 includes an illumination sensor, a humidity sensor, a proximity sensor, an acceleration sensor, a gravity sensor, a gyroscope sensor, a motion sensor, an infrared (IR) sensor, a fingerprint scanning sensor, an optical sensor, an ultrasonic sensor, an environmental sensor (e.g., a pressure sensor, a temperature sensor, a radioactivity detection sensor, a thermal sensor, a gas sensor, etc.), a chemical sensor (e.g., a healthcare sensor, a biometric sensor, etc.), a position sensor, an ethylene sensor, a $CO_2$ sensor, and a nitrogen sensor.

Here, the proximity sensor is a sensor capable of detecting whether there is an object approaching a predetermined detection range or there is an object near the sensor by using an electromagnetic force or infrared light without mechanical contact.

The sensors are embedded in the first sensor 200 at least one of each.

In addition, the first sensor 200 further includes a second AUX terminal 201 for connecting to a first AUX terminal 132 of the main body 100 through an AUX cable 300. Here, the first sensor 200 is activated only when the first AUX terminal 132 of the main body 100 is connected through the AUX cable 300.

Moreover, the first sensor 200 has a sensitivity level range different from that of the second sensor 120.

Furthermore, the first sensor 200 has the sensitivity level range optimized for management of the logistics products.

For example, in a case in which the logistics products are vaccines, the first sensor 200 has the sensitivity level range optimized according to the type of vaccine.

That is, in a case in which the logistics products are Pfizer vaccines, since the temperature range to be maintained during delivery is from --90 to -60° C., the apparatus 10 includes a first sensor 200 capable of measuring the temperature range.

Alternatively, in a case in which the logistics products are Moderna vaccines, since temperature to be maintained during delivery is -20° C., the apparatus 10 includes a first sensor 200 capable of measuring the temperature.

Therefore, the first sensor 200 has different sensitivity level ranges depending on kinds of logistics products. In a case in which the sensitivity level range is changed according to kinds of logistics products, the first sensor 200 is replaced with another one to be attached to the area 3.

Next, the main body 100 includes a first communication unit 110, a second sensor 120, a first input unit 130, a first display unit 140, a first memory 150, and a first processor 160. Such an apparatus 10 may include a larger or smaller number of components than those shown in FIGS. 2 and 3.

The first communication unit 110 includes one or more modules enabling wireless communication between the apparatus 10 and a wireless communication system, between the apparatus 10 and the external terminal 20, between the apparatus 10 and the server 30, or between the apparatus 10 and an external server (not shown). Additionally, the first communication unit 110 includes one or more modules for connecting the external terminal 20 to one or more networks.

Moreover, the first communication unit 110 is a module for obtaining a location (or current position) of the apparatus 10, and a representative example of the first communication unit 110 is a global positioning system (GPS) module or a wireless fidelity (Wi-Fi) module.

For example, the main body 100 of the apparatus 10 obtains a location by using a signal transmitted from a GPS satellite through a GPS module. As another example, in a case of using the Wi-Fi module, the body 100 of the apparatus 10 obtains a location based on information of a wireless access point (wireless AP) transmitting or receiving a wireless signal to or from the Wi-Fi module. The first communication unit 110 is not limited to directly calculating or obtaining the location of the main body 100 of the apparatus 10.

Furthermore, the first communication unit 110 further includes a first short-range communication unit 111 for performing low-power Bluetooth communication (Bluetooth™ Low Energy) with the external terminal 20.

The second sensor 120 senses at least one among temperature, acceleration, humidity, illumination, slope, impact, and location inside the area 3 outside of the area 3 on which the logistics products of the delivery vehicle 2 are loaded.

That is, the second sensor 120 senses environment information around the main body 100 of the apparatus 10 and generates a sensing signal corresponding thereto. The first processor 160 controls the operation of the main body 100 of the apparatus 10 based on the sensing signal, or performs data processing, function, or operation related to an application program installed in the apparatus 10.

For example, the second sensor 120 includes an illumination sensor, a humidity sensor, a proximity sensor, an acceleration sensor, a gravity sensor, a gyroscope sensor, a motion sensor, an infrared (IR) sensor, a fingerprint scanning sensor, an optical sensor, an ultrasonic sensor, an environmental sensor (e.g., a pressure sensor, a temperature sensor, a radioactivity detection sensor, a thermal sensor, a gas sensor, etc.), a chemical sensor (e.g., a healthcare sensor, a biometric sensor, etc.), a position sensor, an ethylene sensor, a $CO_2$ sensor, and a nitrogen sensor.

Here, the proximity sensor is a sensor capable of detecting whether there is an object approaching a predetermined detection range or there is an object near the sensor by using electromagnetic force or infrared light without mechanical contact.

The illumination sensor 121 and the humidity sensor 122 are disposed on the surface of one side of the main body 100. In addition, the rest of the sensors are embedded in the main body 100.

Here, the first processor 160 controls the operation of the main body 100 of the apparatus 10 based on sensing signals according to sensing results of the one or more sensors described above, or performs data processing, functions, or operations related to an application program installed in the apparatus 10. Accordingly, the first processor 160 may combine and utilize information sensed by at least two sensors among the sensors.

The second sensor 120 is deactivated only when the first AUX terminal of the main body 100 is connected to the first sensor 200 through the AUX cable 300.

Moreover, the second sensor 120 has a sensitivity level range different from that of the first sensor 200.

The first input unit 130 is to input image information (or signal), audio information (or signal), data, or information input from a user, and includes an on-off button 131 and the first AUX terminal 132.

In addition, in order to input image information, the first input unit 130 includes at least one first camera (not shown). The first camera (not shown) processes an image frame such as a still image or a video obtained by an image sensor in an imaging mode. The processed image frame is displayed on the first display unit 140 or stored in the first memory 150. Furthermore, the first camera (not shown) includes at least one among a camera for recognizing an iris, and a camera for capturing an image.

Additionally, the first input unit 130 further includes at least one among a time setting button (not shown) for controlling a start of the apparatus 10 or a screen of the first display unit 140, and an adjustment button (not shown) for displaying a QR code.

Here, the button may be a physical hardware button and a virtual button displayed on a touch screen, and in the case of a virtual button, the button is formed on the first display unit 140 in the form of a touch screen.

In addition, the on-off button 131 may be formed of a physical button, a touch button of a touch pad, or a virtual button displayed on the touch screen.

Accordingly, the apparatus 10 is turned on or off while the on-off button 131 is pressed for a predetermined first period of time (hereinafter, referred to as a "long key input").

Moreover, the apparatus 10 may be initialized when the on-off button 131 is in the long key input for a predetermined second period of time. Here, the initialization may be a function that QR codes stored in the apparatus 10 are all deleted (in this instance, the stored QR codes may be deleted after being transferred to an external device set previously), a unit count is set as a default count (factory default setting), or an operation mode of the apparatus 10 is set as the factory default mode. Furthermore, the first period of time, for instance, five seconds is shorter than the second period of time, for instance, six seconds.

In addition, in a case in which the on-off button 131 is input in a state in which an illumination value measured by the illumination sensor 121 is less than or equal to a predetermined illumination value, the apparatus 10 changes the unit count for generating a QR code according to an input method of the on-off button 131.

For example, in a case in which the user inputs the on-off button 131 once while hiding the illumination sensor 122 with a finger, the unit count is changed to one minute, and in a case in which the user inputs the on-off button 131 twice, the unit count is changed to three minutes. That is, based on the number of times that the on-off button 131 is input by the user, the unit count is changed to one minute, three minutes, thirty minutes, one hour, two hours, six hours, etc.

In addition, the first AUX terminal 132 is provided for connection with the first sensor 200 through the AUX cable 300.

The first display unit 140 is in a layer structure with the touch sensor or is integrated with the touch sensor to implement a touch screen. The touch screen provides an input interface between the apparatus 10 and the user, and at the same time, provides an output interface between the apparatus 10 and the user. The first display unit 140 displays the QR code provided by the apparatus 10.

The first memory 150 stores data supporting various functions of the apparatus 10, and especially, stores a QR code. The first memory 150 stores a plurality of application programs or applications driven in the apparatus 10, data for operating the apparatus 10, and instructions. At least a portion of these applications may be downloaded from the server 30 and/or an external server (not shown) via wireless communication. At least a portion of these applications may also exist for the basic functionality of the apparatus 10. Meanwhile, the application program is stored in the first memory 150 and installed on the apparatus 10 to be driven to perform the operation (or function) of the apparatus 10 by the first processor 160.

The first processor 160 controls the overall operation of the apparatus 10 in addition to the operation related to the application program. The first processor 160 processes signals, data, information, etc. input or output by the above-mentioned components, or provides or processes information or function suitable for the user by driving an application program stored in the first memory 150.

In addition, in order to drive the application program stored in the first memory 150, the first processor 160 controls at least a portion of the components described with reference to FIGS. 2 to 3. Furthermore, in order to drive the application program, the first processor 160 combines and operates at least two of the components included in the apparatus 10.

The first processor 160 generates state information indicating the state of the logistics products according to the sensing result of the first sensor 200 or the second sensor 120 every predetermined unit count, and pages the state information in a predetermined period or in real time to generate QR codes.

Here, the QR codes are changed and displayed on the screen according to the generated order, and the code can be changed in real time according to the state of the logistics products changed within the corresponding unit count.

In detail, the QR code has a two-dimensional configuration capable of recording up to 7,089 numbers, up to 4,296 characters, and up to 1,817 Chinese characters by length and width. The QR code may include all of a long sentence Internet address (URL), photo and video information, map information, business card information, and the like. The QR code can record more information as including more points in a small square, but a necessary area is increased if the number of points is increased. Additionally, the QR code is better in recognition speed, recognition rate, and restoring force than general barcodes. The QR code can respond quickly, providing information such as the name of the QR code. Recently, QR codes have been utilized as important PR/marketing means for a company, and so, are widely utilized online and offline. Additionally, the QR code can be accurately recognized even in the case that scanned from any direction since having a square shape. The QR code can be inserted into various types of promotional/advertising materials since unaffected by background images. While the existing one-dimensional bar code can store only number information of about 20 numbers, the QR code can store up to 7,089 numbers, up to 4,296 characters (ASCII), binary digits of up to 2,953 bits, and up to 1,817 Chinese characters, and is more excellent in recognition speed, recognition rate, and restoring force than general barcodes. Barcodes are mainly used for calculation or inventory management, product confirmation, etc., but QR codes are mainly used for marketing, promotion, or PR.

Also, since only a product seller can possess a dedicated external terminal capable of reading the existing barcode, consumers cannot identify information by using barcodes. However, the QR codes allow consumers to directly identify product information using smartphones. A smartphone user can easily obtain various kinds of information when downloading a QR code scanning application provided for free and scanning the QR code posted on an advertisement board, a publicity paper, a poster, a magazine, and the Internet with a smartphone.

The first processor 160 generates QR codes representing state information, stores each of the QR codes in the first memory 150, and displays each of the QR codes on a screen of the first display unit 140. Here, the QR codes can be changed and displayed on the screen according to the generated order.

In a case in which the first processor 160 is connected to the first sensor 200 through the AUX cable 300, the first sensor 200 is activated and the second sensor 120 is deactivated.

The first sensor 200 and the second sensor 120 have different sensitivity level ranges.

Accordingly, the first processor 160 receives the sensing results of the inside of the area 3 every predetermined period from the activated first sensor 200, and generates the status information of the logistics products based on the sensing results received every predetermined period.

Moreover, the first processor 160 generates each of the QR code codes representing each state information, and displays each of the QR code codes on the first display unit 140 in a predetermined manner.

In addition, the first processor 160 generates the corresponding QR code on the basis of only the sensing result received from any one activated among the first sensor 200 and the second sensor 120 and displays the corresponding QR code on the first display unit 140.

The QR codes generated based on any one among the first sensor 200 and the second sensor 120 are accumulatively generated according to the state information changed within the predetermined unit count.

Moreover, in a case in which the first processor 160 is paired with the external terminal 20 through a first short-range communication unit 111, the first processor 160 transmits the state information based on the sensing result of any one activated among the first sensor 200 and the second sensor 120, based on the first short-range communication, to the external terminal 20 in real time.

In a case in which the external terminal 20 is paired, the first processor 160 transmits the state information to the external terminal 20 in real time, and stops the generation of the QR code for the state information.

In a case in which pairing with the external terminal 20 is released, the first processor 160 restart generation of the QR code on the first display unit 140.

In addition, the first processor 160 turns off the screen of the first display unit 140 while the generation operation of the QR code is stopped, or displays the QR code, which was indicated at the time of stopping the generation operation, while the generation operation of the QR code is stopped.

Furthermore, the first processor 160 displays a QR code indicating address information of a website providing the logistics products state management service to the first display unit 140.

Here, the QR code representing the address information is fixedly displayed on the first display unit 140.

Alternatively, the QR code representing the address information is attached to the outside of the area 3, on which the logistics products of the delivery vehicle 2 are loaded, in the form of a sticker.

The apparatus 10 illustrated in FIGS. 2 and 3 includes the main body 100 and the first sensor 200, but is not limited thereto. According to an embodiment, the apparatus 10 may include only the main body 100.

Next, the external terminal 20 will be described with reference to FIG. 4.

The external terminal 20 is an electronic device capable of recognizing a QR code, which is possessed by a person in charge of delivery of logistics products, a person in charge of managing the logistics products, a person who receives the logistics products, a person of a manufacturing company who is in charge of manufacturing the logistics products or articles. Here, the external terminal 20 includes all kinds of handheld wireless communication devices capable of being connected to a web server through a network, such as a cellular phone, a smartphone, a personal digital assistant (PDA), a portable multimedia player (PMP), a tablet PC, and the like.

The external terminal 20 includes a second communication unit 210, a second input unit 220, a second display unit 230, a second memory 240, and a second processor 250. Here, the external terminal 20 includes a larger or smaller number of components than those illustrated in FIG. 4.

The second communication unit 210 includes one or more modules between the external terminal 20 and the wireless communication system, between the external terminal 20 and the apparatus 10, between the external terminal 20 and the server 30, or between the external terminal 20 and the external server (not shown). Moreover, the second communication unit 210 includes one or more modules for connecting the external terminal 20 to one or more networks.

The second communication unit 210 further includes a second short-range communication unit 211 for performing low-power Bluetooth communication (Bluetooth™ Low Energy) with the external terminal 20.

The second input unit 220 is to input image information (or signal), audio information (or signal), data, or information input from a user, and in order to input image information, the external terminal 20 includes at least one camera 221 disposed on the front surface or the rear surface.

Here, the camera 221 processes an image frame such as a still image or a video obtained by an image sensor in a video call mode or an imaging mode. The processed image frame is displayed on the second display unit 230 or stored in the second memory 240.

On the other hand, at least one camera 221 provided on the external terminal 20 is arranged to have a matrix structure, and a plurality of image information having various angles or focuses is input to the external terminal 20 through the camera 221 forming the matrix structure.

In addition, the camera 221 is arranged in a stereo structure to obtain a left image and a right image for implementing a stereoscopic image.

In addition, the camera 221 captures a still image or a video image according to a user's manipulation. Here, the camera 221 is a recognizer capable of imaging the QR code provided by the apparatus 10 according to the user's manipulation.

The second input unit 220 receives information from the user. When information is input through the second input unit 220, the second control unit 250 controls the operation of the external terminal 20 to correspond to the input information.

The second input unit 220 includes a mechanical input means (or a mechanical key, for example, a button, a dome switch, a jog wheel, a jog switch, etc. located on the front surface, the rear surface or the side surface of the external terminal 20), and a touch input means. For example, the touch input means includes a virtual key, a soft key, or a visual key displayed on the touch screen through software processing, or a touch key disposed on a portion other than the touch screen. The virtual key or the visual key may be displayed on the touch screen in various forms, and is composed of, for example, graphic, text, icon, video, or a combination thereof.

The second display unit 230 is in a layer structure with the touch sensor or is integrated with the touch sensor to implement a touch screen. The touch screen provides an input interface between the apparatus 10 and the user, and at the same time, provides an output interface between the apparatus 10 and the user. The first display unit 140 displays the QR code provided by the apparatus 10. Such a touch screen provides an input interface between the external terminal 20 and the user, and at the same time, provides an output interface between the user external terminal 20 and the user.

In a case in which the camera 221 of the second input unit 220 recognizes the QR code provided by the apparatus 10, the second display unit 230 displays the recognized QR code and the state information included in the recognized QR code.

The second memory 240 stores data supporting various functions of the external terminal 20. The second memory 240 stores a plurality of application programs or applications driven in the external terminal 20, data for operating the external terminal 20, and instructions. At least a portion of these applications may be downloaded from the server 30 and/or an external server (not shown) via wireless communication. At least a portion of these applications may also exist for the basic functions of the external terminal 20, for instance, call receiving and transmitting functions, message receiving and transmitting functions, or the likes. Meanwhile, the application program is stored in the second memory 240 and installed on the external terminal 20 to be driven to perform the operation (or function) of the external terminal 20 by the second processor 250.

The second processor 250 controls the overall operation of the external terminal 20 in addition to the operation related to the application program. The second processor 250 processes signals, data, information, etc. input or output by the above-mentioned components, or provides or processes information or function suitable for the user by driving an application program stored in the second memory 240.

In addition, in order to drive the application program stored in the second memory 240, the second processor 250 controls at least a portion of the components described with reference to FIG. 4. Furthermore, in order to drive the application program, the second processor 250 combines and operates at least two of the components included in the external terminal 20.

The second processor 250 transmits the QR code imaged through the camera 221 to the server 30.

That is, in a case in which the second processor 250 images the QR code displayed on the apparatus 10 through the camera 221, the second processor 250 transmits the QR code to the server 30.

Next, the server 30 will be described with reference to FIG. 5.

The server 30 is a device for providing a service for integrally managing logistics products, and provides integrated logistics products information by interconnecting information on products based on QR codes obtained during production, distribution, and receiving processes of the products.

The server 30 receives at least one digital code generated during production, distribution, and receiving processes of the products. The digital code is a code representing at least one of the production, distribution, and receiving processes of the product, and includes all kinds of image codes, such as a barcode or a QR code.

For example, the server 30 receives, from the external terminal 20, at least one digital code (e.g., a barcode, or a QR code), such as a digital code (e.g., a barcode, or QR code) generated during a product production process, a digital code (e.g., a barcode, or a QR code) generated during a product distribution process, and a digital code (e.g., a barcode, or QR code) generated during a product receiving process. In this instance, the server 30 receives the digital code (e.g., a barcode, or QR code) from different external terminals during the production, distribution, and reception processes. The server 30 matches information included in the received digital code (e.g., a barcode, or QR code) to make a database. Thereafter, the server 30 provides various information (i.e., history data of the entire processes of production, distribution, and reception) through the database.

The digital code expresses numbers, characters, various symbols, photos, videos, etc. into a digital value (a binary code consisting of 0 or 1), for instance, may include a barcode, a QR code, and the like. In other words, the digital code refers to an imaged code containing specific information, like a barcode, a QR code, or the like.

In an embodiment, the server 30 obtains a digital code including information (e.g., shipment information) for a logistics product generated in the product production process (i.e., a manufacturing process), and obtains a general QR code generated through the apparatus 10 for measuring a delivery state during a delivery process of the logistics product. The server 30 performs datafication of shipment information and delivery state information of the logistics products on the basis of the digital code and the general QR code by linking them and stores them in the database. The server 30 provides various information (i.e., history data of the entire processes of production, distribution, and reception) on the logistics product based on the linked information. For example, in a case in which the general QR code displayed on the screen of the apparatus 10 is recognized by the external terminal 20, the server 30 provides various information (e.g., shipment information, and the like) on the logistics product linked with the general QR code as well as information (namely, shipment state information) included in the general QR code based on the recognized general QR code to the external terminal 20.

That is, since the server 30 links and manages information on the products obtained during the processes of production, distribution, and reception, the server 30 can efficiently integrate and manage the data. In addition, the server 30 effectively provides various information on the products through the linked data, and effectively utilizes only information required according to the purpose.

The server 30 includes all kinds of handheld wireless communication devices capable of being connected to a web server through a network, such as a cellular phone, a smartphone, a personal digital assistant (PDA), a portable multimedia player (PMP), a tablet PC, and the like, and is one of digital devices having a memory means, such as a personal computer (e.g., a desktop computer, a notebook computer, etc.), a workstation, a personal digital assistant (PDA), a web pad, and the like, and has a micro-processor to have arithmetic capacity.

The server 30 includes a third communication unit 310, a third memory 320, and a third processor 330. Here, the server 30 may include a larger or smaller number of components than those shown in FIG. 5.

The third communication unit 310 includes one or more modules between the server 30 and the wireless communication system, between the server 30 and the apparatus 10, between the server 30 and the external terminal 20, or between the server 30 and the external server (not shown). The third communication unit 310 includes one or more modules for connecting the server 30 to one or more networks.

The third memory 320 stores a plurality of application programs or applications driven in the apparatus 10, data for operating the apparatus 10, and instructions. At least a portion of these applications may be downloaded from the server 30 and/or an external server (not shown) via wireless communication. At least a portion of these applications may also exist for the basic functionality of the server 30. Meanwhile, the application program is stored in the third memory 320 and installed on the server 30 to be driven to perform the operation (or function) of the server 30 by the third processor 330.

The third memory 320 further includes a database 321, and the database 321 stores information (e.g., shipment information, delivery state information, etc.) on the product. That is, the database 321 links and stores product-related data included in the QR code obtained during the production, distribution, and reception processes of the product.

In addition to the operation related to the application program, the third processor 330 controls the overall operation of the server 30. The third processor 330 processes signals, data, information, etc. input or output by the above-mentioned components, or provides or processes information or function suitable for the user by driving an application program stored in the third memory 320.

In addition, in order to drive the application program stored in the third memory 320, the third processor 330 controls at least a portion of the components described with reference to FIG. 5. Furthermore, in order to drive the application program, the third processor 330 combines and operates at least two of the components included in the server 30.

Next, the external server (not shown) is a server for integrally managing logistics products, a manufacturer server for sending logistics products, a customer server for receiving the logistics products, or the like.

Alternatively, the external server (not shown) may be a device providing a download of an application to provide the logistics products state management service.

In an embodiment, the external server (not shown) may be a server used to manage and store product information by a product manufacturer. For example, the external server (not shown) stores and manages product information and/or shipment information of products. Here, the product information includes a product identifier, a product name, a manufacturing number, a standard, a unit, a quantity, an amount, a manufacturing year, and the like. The shipment information includes the product information and shipment conditions for shipment the products, for instance, includes a payment condition, a departure date, a delivery method, and the like.

The external server (not shown) includes all kinds of handheld wireless communication devices capable of being connected to a web server through a network, such as a cellular phone, a smartphone, a personal digital assistant (PDA), a portable multimedia player (PMP), a tablet PC, and the like, and is one of digital devices having a memory means, such as a personal computer (e.g., a desktop computer, a notebook computer, etc.), a workstation, a personal digital assistant (PDA), a web pad, and the like, and has a micro-processor to have arithmetic capacity.

Next, the communication network 40 transmits and receives various information with the apparatus 10, the external terminal 20, the server 30, and the external server (not shown). The communication network 40 uses one among a variety of types of communication networks, for example, a wireless communication method such as a wireless local area network (WLAN), Wi-Fi, WiBro, WiMAX, high speed downlink packet access system (HSDPA), and the like, or a wired communication method such as Ethernet, xDSL (ADSL or VDSL), hybrid fiber coax (HFC), fiber to the curb (FTTC), fiber to the home (FTTH), and the like.

On the other hand, the communication network 40 is not limited to the communication methods described above, and may include any other well-known or future communication method in addition to the above-described communication methods.

Hereinafter, a method for providing an integrated logistics products management service according to the present disclosure will be described, and the method may be performed by the system 1 described with reference to FIGS. 1 to 5.

Figure 6:
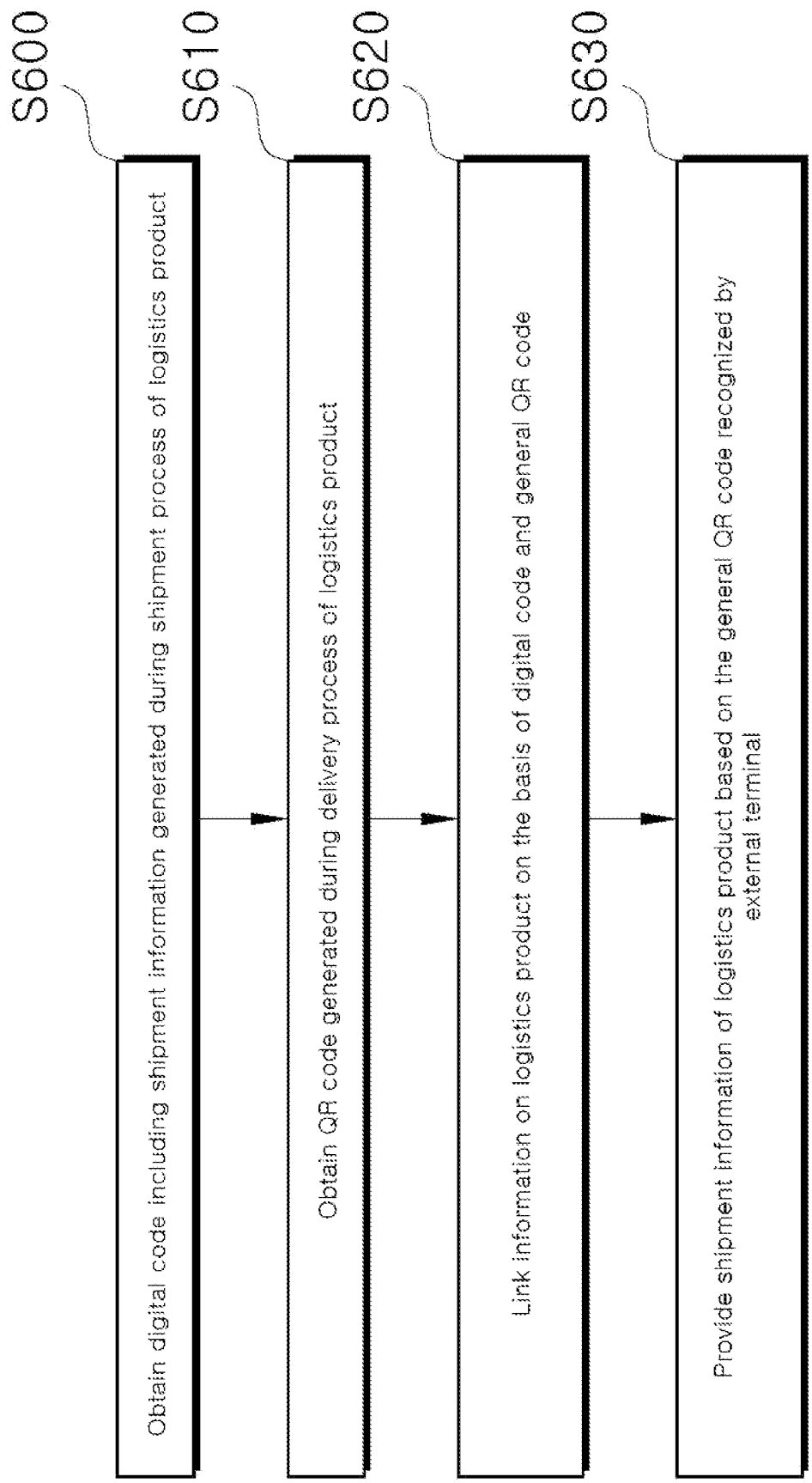
FIG. 6 is a flow chart illustrating a method for providing an integrated logistics products management service according to the present disclosure.

FIG. 6 is a flow chart illustrating a method for providing an integrated logistics products management service according to the present disclosure.

The server 30 obtains a digital code including shipment information generated during the shipment process of the logistics product (S600).

Here, the shipment information includes product information, such as a product identifier, a product name, a manufacturing number, a standard, a unit, a quantity, an amount, a manufacturing year, and the like, and also includes information, such as shipment conditions for shipment the products, for instance, includes a payment condition, a departure date, a delivery method, and the like.

In addition, the digital code expresses numbers, characters, various symbols, photos, videos, etc. into a digital value (a binary code consisting of 0 or 1), for instance, may include a barcode, a QR code, and the like. In other words, the digital code refers to an imaged code containing specific information, like a barcode, a QR code, or the like.

Furthermore, the digital code includes the above-mentioned shipment information, and may be generated by a manufacturer and attached to a product, a packaging box, or the like.

Specifically, the manufacturer generates the product information, the shipment information, and the like for product management in the process of producing and shipment products, and stores the information as data. In addition, at the time of shipment, the product information, the shipment information, and the like are converted into a digital code, such as a bar code, a QR code, etc., and then, the digital code is attached to a product, a packaging box, or the like to be delivered to a final destination. In this instance, the product information, the shipment information, and the like are stored in a server (i.e., the external server) of the manufacturer.

That is, the server 30 receives a digital code from the external terminal 20 at any time ranging from shipment of the logistics product to receipt of the product. For example, in the delivery process, the digital code attached to a product or a packaging box is recognized through an external terminal of a deliverer (e.g., a delivery person, etc.), and is transferred to the server 30.

The server 30 obtains the general QR code generated through the apparatus 10 for measuring the delivery state during the delivery process of the logistics product (S610).

Here, the apparatus 10 is attached to the inside of the delivery vehicle, the logistics product, or the packaging box to sense at least one of temperature, acceleration, humidity, illumination, slope, impact, and location during the delivery process. Moreover, the apparatus 10 generates delivery state information of the logistics product based on the sensing result, and generates a general QR code including the delivery state information to display the same on a screen.

In other words, the general QR code includes sensing data obtained by measuring at least one among temperature, acceleration, humidity, illumination, slope, impact, and location through the sensor of the apparatus 10 during the delivery process of the logistics product.

For example, in a delivery completion process of the product or in the product receiving process, the general QR code displayed on the screen of the apparatus 10 is recognized by the external terminal of the delivery person or a receiver, and then, is transferred to the server 30.

The server 30 links the shipment information and the delivery state information of the logistics product based on the digital code and the general QR code (S620).

That is, since the digital code includes the shipment information of the logistics product and the general QR code includes the delivery state information of the logistics product, the server 30 matches the shipment state information obtained from the digital code and the delivery state information obtained from the general QR code to store the matched delivery state information in the database.

The server 30 provides the shipment information of the logistics product based on the general QR code recognized by the external terminal 20 (S630).

That is, the server 30 links information on the logistics product based on the digital code and the general QR code to make a database thereof, and provides various information (e.g., shipment information, etc.) on the logistics product linked with the general QR code as well as information (e.g., shipment state information) included in the general QR code to the external terminal.

Furthermore, in providing information on the logistics product, the server 30 generates information on the logistics product in the form of an electronic document. For example, the server 30 generates data regarding an electronic document, such as an electronic invoice, an electronic output certificate, an electronic receipt certificate, etc. through the digital code (e.g., a barcode, a QR code, etc.) obtained at the time of shipment of the products. When the QR code is recognized after completion of delivery at a destination, the electronic document, such as an electronic invoice, an electronic output certificate, an electronic receipt certificate, etc. through the information linked with the QR code is provided.

FIG. 6 illustrates that the operations S600 to S630 are carried out in consecutive order, but it is just an example of the technical idea of the embodiment. Therefore, it will be understood by those of ordinary skill in the art that various changes and modifications of the order illustrated in FIG. 6 or changes and modifications that one or more of the operations S600 to S630 are carried out in parallel may be applied to the present disclosure. That is, the time series order illustrated in FIG. 6 is not restricted thereto.

Figure 7:
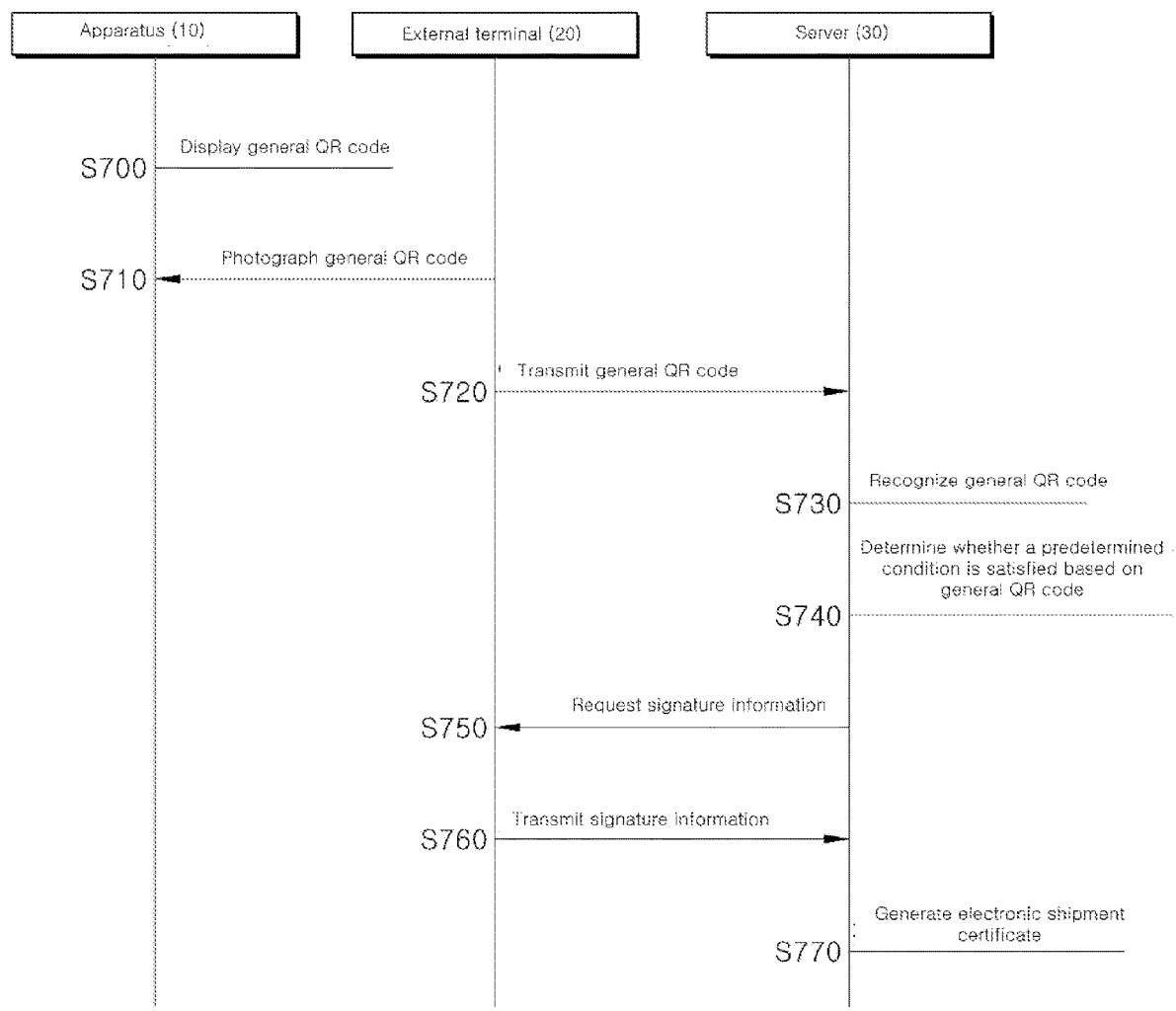
FIG. 7 is a flow chart illustrating a process of providing an electronic shipment certificate in a method for providing an integrated logistics products management service according to the present disclosure.

FIG. 7 is a flow chart illustrating a process of providing an electronic shipment certificate in the method for providing an integrated logistics products management service according to the present disclosure. The process of FIG. 7 is a detailed process of operation S630 of FIG. 6.

The apparatus 10 generates a general QR code including delivery state information of the logistics product and displays the generic QR code on the screen of the apparatus 10 (S700).

In an embodiment, the apparatus 10 is attached to the inside of a delivery vehicle, a product, or a packaging box to measure a delivery state (i.e., a delivery environment) through the sensor during a delivery process. That is, the apparatus 10 senses at least one of temperature, acceleration, humidity, illumination, slope, impact, and location during delivery of the logistics product through the sensor. The apparatus 10 generates delivery state information of the logistics product based on the sensing result, generates a general QR code representing the delivery state information, and displays the generated general QR code on the screen of the apparatus 10.

The external terminal 20 images the general QR code through the camera 221 (S710), and transmits the imaged general QR code to the server 30 (S720).

For example, in a case in which the delivery of the logistics product is completed (that is, in a case in which the logistics product arrives at the destination), a recipient of the logistics product can photograph the general QR code displayed on the screen of the apparatus 10 using the recipient's own external terminal 20. The imaged general QR code can be transmitted to the server 30.

The server 30 recognizes the general QR code received from the external terminal 20 (S730).

That is, in a case in which the server 30 receives the general QR code displayed on the screen of the apparatus 10 through the external terminal 20, the server 30 recognizes the information in the general QR code.

The server 30 determines whether shipment or delivery of the logistics product satisfies predetermined conditions based on the recognized general QR code (S740).

The predetermined conditions include at least one among shipment conditions and delivery condition for the logistics product. For example, the shipment conditions may be the predetermined conditions when the product is shipped, and for example, a payment condition, a departure date, a delivery method, a delivery path, a shipment point, a shipment price, a shipment quantity, and the like may be predetermined as shipment conditions. In addition, the delivery conditions may be preset conditions of state information required while storing and delivering the logistics products, for instance, temperature, acceleration, humidity, illumination, slope, impact, location, and the like.

The predetermined conditions include at least one among the shipment conditions and the delivery conditions as described above, and may be preset in the digital code. In other words, when the digital code is generated, at least one of the predetermined shipment conditions and the delivery conditions may be included in the digital code.

That is, the server 30 determines whether shipment or delivery of the logistics product satisfies at least one of the shipment conditions and delivery conditions preset in the digital code based on the sensing data included in the general QR code received through the external terminal 20.

The general QR code includes sensing data of at least one among temperature, acceleration, humidity, illumination, slope, impact, and location measured during the delivery process. Therefore, based on the sensing data, it is possible to determine whether the logistics product has been delivered or stored in accordance with the conditions predetermined when the logistics product is shipped.

For example, in a case in which the logistics product is a vaccine, since the temperature to be maintained during delivery is determined according to kinds of the vaccine, temperature must be previously set as the delivery condition. Accordingly, the delivery temperature condition is included in the digital code generated at the time of shipment of the product. Thereafter, since the temperature information measured through the apparatus 10 during the delivery process is recorded in the general QR code, the server 30 determines whether the vaccine satisfies the delivery temperature condition preset in the digital code based on the delivery temperature information included in the general QR code.

For example, in a case in which the logistics product is a vaccine, mean kinetic temperature (MKT) index may be pre-set in the shipment condition (i.e., a shipment certificate issuing condition). The MKT index is an index depicting influences on medicine and medical supplies by calculating various temperature changes progressed for a predetermined period of time as single temperature. So, it is determined whether to discard the vaccine through the MKT index. The condition for the MKT index is included in the digital code generated at the time of shipment of the product. Moreover, as described above, since the apparatus 10 measures the temperature through the sensor every predetermined period to generate each QR code, the server 30 calculates a temperature change based on the general QR code generated every predetermined period. Therefore, the server 30 determines whether the vaccine is delivered by satisfying the MKT index condition preset in the digital code based on the temperature change calculated through the general QR code.

Since the server 30 links the shipment information in the digital code and the delivery state information in the general QR code and stores them in the database, it is possible to easily determine whether the delivery of the corresponding product is properly performed through the recognition of the general QR code when the product is received.

In a case in which the predetermined condition is satisfied as the determination result, the server 30 requests signature information to the external terminal 20 (S750), and receives the signature information from the external terminal 20 (S760).

In an embodiment, the server 30 transmits a request signal requesting the signature information to the external terminal 20. When the external terminal 20 receives a request signal of the signature information from the server 30, the external terminal 20 displays a signature screen to receive the signature information. The external terminal 20 receives the signature information from an external terminal user (e.g., a recipient of the logistics product) and transmits the signature information to the server 30.

The server 30 generates an electronic shipment certificate for shipment information including the signature information (S770).

That is, in a case in which the server 30 receives the signature information from the external terminal 20, the server 30 generates the shipment information for the logistics product including the signature information. In this instance, the server 30 generates information on the logistics product in the form of an electronic document. For example, the shipment information including the signature of the recipient is generated as an electronic shipment certificate, and the recipient's signature information is generated as an electronic receipt certificate.

Thereafter, the server 30 provides an electronic document (e.g., an electronic shipment certificate, an electronic receipt certificate, etc.) for the logistics product to the external terminal 20. For example, in a case in which the logistics product arrives at the destination and the delivery is completed, the recipient external terminal 20 or the producer (manufacturer) external terminal 20 can receive the electronic shipment certificate or the electronic receipt certificate from the server 30 by imaging the general QR code displayed on the apparatus 10 through the camera.

The present disclosure can easily and effectively integrate data for the product since managing information on the product based on the QR code obtained during the production, distribution, and receiving processes of the product. In addition, The present disclosure can integrally manage all data through just one server (namely, the server for providing the integrated logistics products management service) without needing to access separate servers for the production, distribution, and receiving processes of the product. Therefore, the present disclosure can easily provide information and increase information applicability. Furthermore, according to the present disclosure, it is convenient to confirm and manage data without performing additional work by performing automated data interworking with respect to the entire processes of production, distribution, and reception.

On the other hand, conventionally, a manufacturer (e.g., a pharmaceutical company) directly provides manufactured products (e.g., medical supplies) and a shipment certificate of a hardcopy type to a delivery company (e.g., a delivery man) In addition, the delivery company receives a signature for the shipment certificate from a recipient when delivery is completed, and then, provides the signed shipment certificate to the manufacturer. In this instance, since the shipment certificate is in a hardcopy type, it is necessary to match the shipment certificate signed by the recipient with the existing information. In addition, since the manufacturer's DB and the delivery company's DB are used separately, it is difficult to provide the integrated logistics products management service according to the present disclosure.

In addition, in a case in which a biological agent is delivered, an automatic temperature recording device (inside a vehicle or a transportation container) and a thermometer (outside of the transport container) should be additionally installed, it is verified in advance whether or not a storage temperature is maintained during delivery, and the temperature record measured during delivery should be stored for two years. Therefore, compared with the conventional method, the method in the present disclosure can effectively deliver and store biological agents.

FIG. 7 illustrates that the operations 5700 to 5770 are carried out in consecutive order, but it is just an example of the technical idea of the embodiment. Therefore, it will be understood by those of ordinary skill in the art that various changes and modifications of the order illustrated in FIG. 7 or changes and modifications that one or more of the operations S700 to S770 are carried out in parallel may be applied to the present disclosure. That is, the time series order illustrated in FIG. 7 is not restricted thereto.

Figure 8:
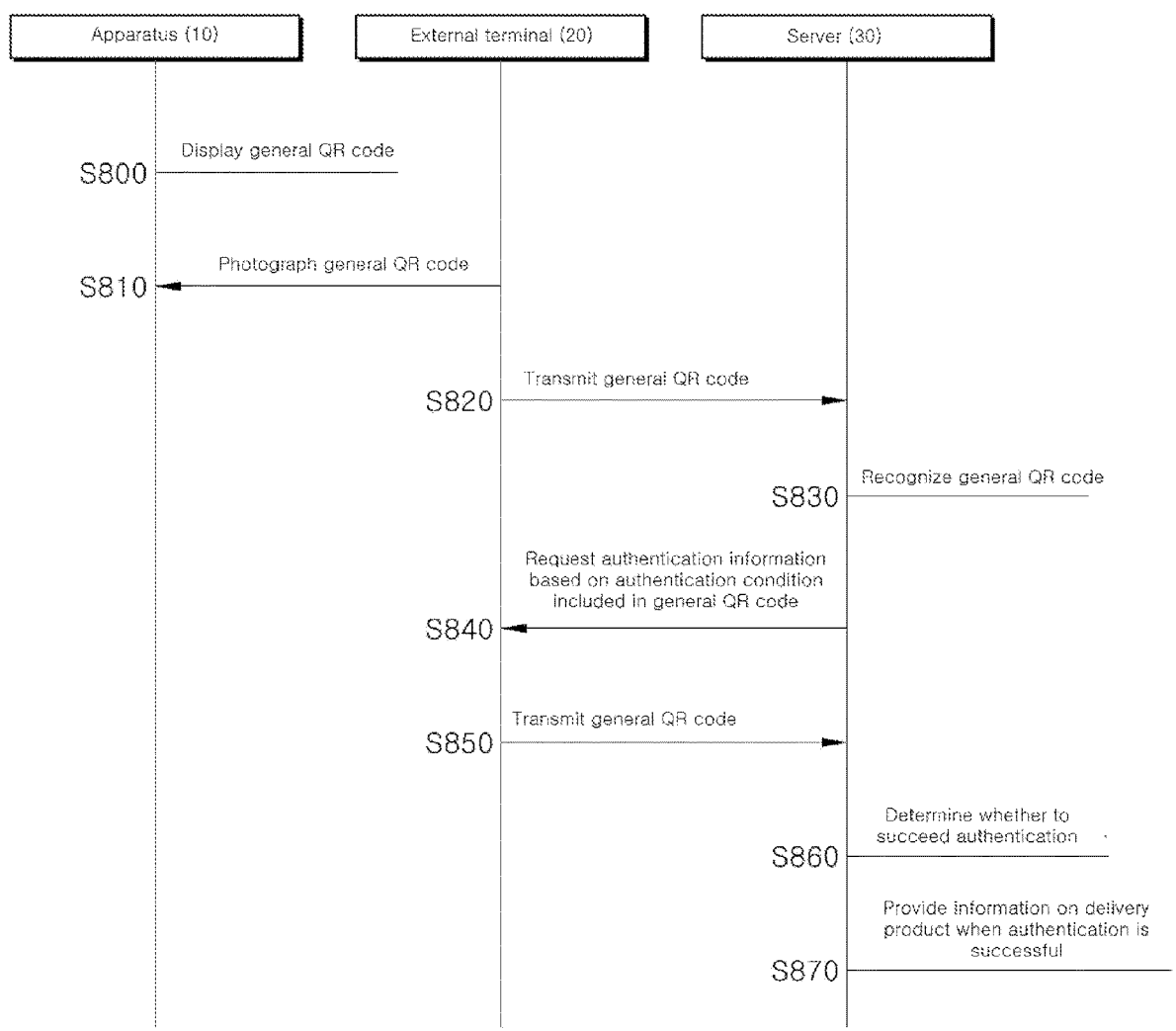
FIG. 8 is a flow chart illustrating an authentication process of an external terminal 20 in the method for providing an integrated logistics products management service according to the present disclosure.

FIG. 8 is a flow chart illustrating an authentication process of the external terminal 20 in the method for providing an integrated logistics products management service according to the present disclosure. The process of FIG. 8 may be performed in operation S630 of FIG. 6 or performed before or after the operation S630 of FIG. 6.

The apparatus 10 generates a general QR code including delivery state information of the logistics product and displays the generic QR code on the screen of the apparatus 10 (S800).

In an embodiment, the apparatus 10 is attached to the inside of a delivery vehicle, a product, or a packaging box to measure a delivery state (i.e., a delivery environment) through the sensor during a delivery process. That is, the apparatus 10 senses at least one of temperature, acceleration, humidity, illumination, slope, impact, and location during delivery of the logistics product through the sensor. The apparatus 10 generates delivery state information of the logistics product based on the sensing result, generates a general QR code representing the delivery state information, and displays the generated general QR code on the screen of the apparatus 10.

The external terminal 20 images the general QR code through the camera 221 (S810), and transmits the imaged general QR code to the server 30 (S820).

For example, in a case in which the delivery of the logistics product is completed (that is, in a case in which the logistics product arrives at the destination), a recipient of the logistics product can photograph the general QR code displayed on the screen of the apparatus 10 using the recipient's own external terminal 20. The imaged general QR code can be transmitted to the server 30.

The server 30 recognizes the general QR code received from the external terminal 20 (S830).

That is, in a case in which the server 30 tries to recognize the general QR code displayed on the screen of the apparatus 10 through the external terminal 20, the server 30 performs an authentication process for the external terminal 20.

In detail, in a case in which there is an attempt to recognize the external terminal 20 with respect to the general QR code displayed on the screen of the apparatus 10, the server 30 generates a request signal of authentication information and transmits the request signal to the external terminal 20 (S840). Furthermore, the external terminal 20 transmits the authentication information in response to the request signal of the authentication information received from the server 30 (S850).

In an embodiment, the server 30 generates a request signal of the authentication information based on an authentication condition included in the general QR code, and transmits the request signal to the external terminal 20. In this instance, the external terminal 20 transmits authentication information corresponding to the request signal to the server 30.

Here, the authentication condition may be information specifying an authentication method for performing authentication with respect to a user or an external terminal attempting to recognize the QR code, and may be information preset in the general QR code. That is, the authentication condition may be a condition related to authentication of a user or a terminal, and may be a condition related to authentication information requested during authentication. For example, at least one of identification information, location information, time information, and user information for an external terminal may be used as the authentication condition.

For example, in a case in which the identification information for the external terminal is set as the authentication condition, the server 30 generates a request signal requesting identification information of the external terminal based on the authentication condition included in the general QR code and transmits the request signal to the external terminal 20. In this instance, the external terminal 20 generates identification information of the external terminal and transmits the identification information to the server 30. Here, the identification information for the external terminal includes an identification code assigned to the external terminal (i.e., the apparatus), user identification information (e.g., account, password, etc.) of an application installed in the external terminal.

For example, in a case in which the location information is set as the authentication condition, the server 30 generates a request signal requesting the location information of the user or the external terminal based on the authentication condition included in the general QR code, and transmits the request signal to the external terminal 20. In this instance, the external terminal 20 generates the requested location information, and transmits the generated location information to the server 30. For example, the external terminal 20 generates the location information through a GPS module or a Wi-Fi module in the terminal. Alternatively, the external terminal 20 receives a receiving place for receiving the logistics product from the user, and generates location information.

For example, in a case in which the time information is set as the authentication condition, the server 30 generates a request signal requesting the time information based on the authentication condition included in the general QR code, and transmits the generated request signal to the external terminal 20. In this instance, the external terminal 20 generates the requested time information, and transmits the generated time information to the server 30. For example, the external terminal 20 generates time information on the basis of the date and time receiving the request signal. Alternatively, the external terminal 20 receives the receiving time of the logistics product from the user, and generates the time information.

For example, in a case in which the user information is set as the authentication condition, the server 30 generates a request signal requesting user information based on the authentication condition included in the general QR code, and transmits the generated request signal to the external terminal 20. In this instance, the external terminal 20 generates the requested user information, and transmits the generated user information to the server 30. Here, the user information includes a fingerprint, an iris, a signature, and the like. For example, the external terminal 20 recognizes a user's fingerprint through a fingerprint recognition sensor in the terminal, generates user authentication information on the basis of the user fingerprint, and transmits the user authentication information to the server 30. The external terminal 20 recognizes the user's iris through the camera in the terminal, generates user authentication information on the basis of the user's iris, and transmits the user authentication information to the server 30. The external terminal 20 receives a user signature through an input unit of the terminal, generates user authentication information based on the user signature, and transmits the user authentication information to the server 30.

Alternatively, as an example, a random number in the QR code may be inserted and used as the authentication condition. The server 30 generates an authentication request signal based on the authentication condition (e.g., authentication using a random number) included in the general QR code, and transmits the authentication request signal to the external terminal 20. In this instance, the server 30 generates a random number, and transmits the random number to the external terminal 20. The external terminal 20 transmits the received random number to the server 30, and the server 30 compares the received random number with the random number generated by the server to determine whether to authenticate. In this instance, the random number may be generated by encrypting.

The server 30 determines whether the authentication is successful on the basis of the authentication information received from the external terminal 20 (S860).

In other words, in a case in which the authentication information corresponding to the authentication request signal is received from the external terminal 20, the server 30 determines whether the received authentication information corresponds to the authentication condition.

In a case in which the authentication is successful, the server 30 provides shipment information of the logistics product to the external terminal 20 (S870).

In this instance, the server 30 generates information on the logistics product in the form of an electronic document. For example, shipment information may be generated as an electronic shipment certificate. That is, the server 30 generates an electronic publication certificate for the shipment information of the logistics product, and provides the electronic attendance certificate to the external terminal 20.

For example, in a case in which the logistics product arrives at the destination and the delivery is complete, the recipient external terminal 20 or producer (manufacturer) external terminal 20 can take a photograph of the general QR code displayed on the apparatus 10 through the camera. In this case, the authentication process for the external terminal is performed first. In a case in which the authentication is successful, an electronic shipment certificate and an electronic receipt certificate can be provided from the server 30.

In a case in which the authentication is failed through the authentication process, the server 30 generates a re-authentication request signal of the authentication information, and transmits the re-authentication request signal to the external terminal 20.

In a case in which the re-authentication fails beyond a predetermined number of times, the server 30 generates a dummy QR code representing false information, and then, provides the dummy QR code to the external terminal 20 instead of an actual QR code.

In a case in which the re-authentication fails beyond a predetermined number of times, the server 30 displays a predetermined image (for instance, 'access prohibition') instead of an actual QR code, or locks the screen after turning off the screen on which the QR code is displayed.

FIG. 8 illustrates that the operations S800 to S870 are carried out in consecutive order, but it is just an example of the technical idea of the embodiment. Therefore, it will be understood by those of ordinary skill in the art that various changes and modifications of the order illustrated in FIG. 8 or changes and modifications that one or more of the operations S800 to S870 are carried out in parallel may be applied to the present disclosure. That is, the time series order illustrated in FIG. 8 is not restricted thereto.

Figure 9:
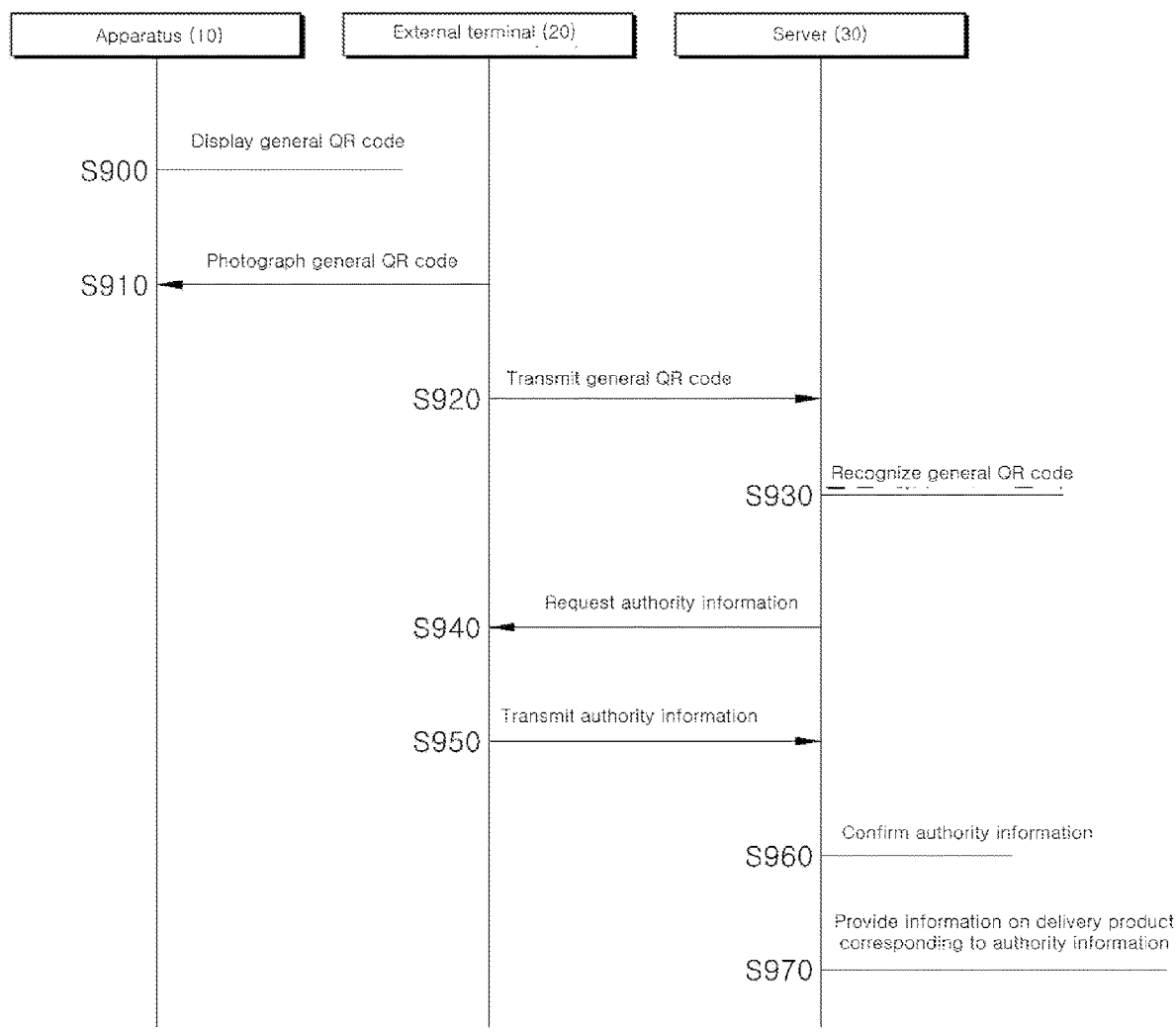
FIG. 9 is a flow chart illustrating a process of confirming authority of the external terminal 20 in the method for providing an integrated logistics products management service according to the present disclosure.

FIG. 9 is a flow chart illustrating an authority confirmation process of the external terminal 20 in the method for providing an integrated logistics products management service according to the present disclosure. The process of FIG. 9 may be performed in operation S630 of FIG. 6 or performed before or after the operation S630 of FIG. 6.

The apparatus 10 generates a general QR code including delivery state information of the logistics product and displays the generic QR code on the screen of the apparatus 10 (S900).

In an embodiment, the apparatus 10 is attached to the inside of a delivery vehicle, a product, or a packaging box to measure a delivery state (i.e., a delivery environment) through the sensor during a delivery process. That is, the apparatus 10 senses at least one of temperature, acceleration, humidity, illumination, slope, impact, and location during delivery of the logistics product through the sensor. The apparatus 10 generates delivery state information of the logistics product based on the sensing result, generates a general QR code representing the delivery state information, and displays the generated general QR code on the screen of the apparatus 10.

The external terminal 20 images the general QR code through the camera 221 (S910), and transmits the imaged general QR code to the server 30 (S920).

For example, in a case in which the delivery of the logistics product is completed (that is, in a case in which the logistics product arrives at the destination), a recipient of the logistics product can photograph the general QR code displayed on the screen of the apparatus 10 using the recipient's own external terminal 20. The imaged general QR code can be transmitted to the server 30.

The server 30 recognizes the general QR code received from the external terminal 20 (S930).

That is, in a case in which the server 30 tries to recognize the general QR code displayed on the screen of the apparatus 10 through the external terminal 20, the server 30 performs an authority confirmation process for the external terminal 20.

In detail, in a case in which there is an attempt to recognize the external terminal 20 with respect to the general QR code displayed on the screen of the apparatus 10, the server 30 generates a request signal of authority information and transmits the request signal to the external terminal 20 (S940). Furthermore, the external terminal 20 transmits the authority information in response to the request signal of the authority information received from the server 30 (S950).

Thereafter, the server confirms the authority of the external terminal 20 based on the received right information (S960).

For example, the server 30 confirms authority information for the external terminal based on at least one among the identification information, the location information, the time information, and the user information for the external terminal.

Here, the identification information for the external terminal includes an identification code assigned to the external terminal (i.e., the apparatus), user identification information (e.g., account, password, etc.) of an application installed in the external terminal. The location information may be the location of the external terminal or a receiving place of the product. The time information may be the time at which recognition of the QR code is attempted, or the time at which the product is received. The user information may be information such as a fingerprint, an iris, a signature, etc. of a user.

Since it is possible to determine whether the external terminal or the user of the external terminal is a manufacturer, a delivery company (for example, a delivery man), or a recipient through the identification information, the location information, the time information, and the user information with respect to the external terminal, different authorities are assigned to the manufacturer, the delivery company, and the recipient.

In other words, the server 30 determines whether the authority granted to the external terminal or the user of the external terminal is authority for the recipient, authority for the manufacturer, or authority for the delivery company through the identification information, the location information, the time information, and the user information with respect to the external terminal.

The server 30 provides information on the logistics product corresponding to the authority information for the external terminal 20 (S970).

For example, in a case in which it is confirmed that recipient authority information for the external terminal 20 is assigned, the server 30 provides a QR code region associated with signature information of a recipient to the external terminal 20. In this case, the external terminal 20 displays a screen for receiving the signature information of the recipient through recognition of the general QR code.

In a case in which it is confirmed that manufacturer authority information for the external terminal 20 is assigned, the server 30 provides a QR code region associated with the electronic shipment certificate to the external terminal 20. In this case, the external terminal 20 outputs an electronic shipment certificate through recognition of the general QR code.

That is, the server 30 selectively provides only the QR code region corresponding to the authority information in the general QR code according to the authority of the external terminal 20.

In order to provide the corresponding QR code for each authority, a data structure of the QR code according to the present disclosure is composed of a header and a body. The header and the body are assigned bits or bytes of a predetermined size. Here, the header includes a plurality of fields, and authority information is recorded in each field. For example, authority information for the recipient is recorded in the first field, authority information for the manufacturer is recorded in the second field, and authority information for the delivery company is recorded in the third field. In addition, actual data with respect to the body is recorded. For example, with respect to the external terminal having recipient authority, the server 30 recognizes a location of the body corresponding to the corresponding authority based on the information recorded in the first field region, thereby recognizing only the region of the corresponding QR code for each authority.

FIG. 9 illustrates that the operations S900 to S970 are carried out in consecutive order, but it is just an example of the technical idea of the embodiment. Therefore, it will be understood by those of ordinary skill in the art that various changes and modifications of the order illustrated in FIG. 9 or changes and modifications that one or more of the operations S900 to S970 are carried out in parallel may be applied to the present disclosure. That is, the time series order illustrated in FIG. 9 is not restricted thereto.

According to the problem solving means of the present disclosure, it is possible to sense at least one among temperature, acceleration, humidity, illumination, inclination, impact, and location in a delivery vehicle for delivering logistics products, and to provide the state information of the logistics products in the form of a QR code. So, in a case in which the user has a terminal and an application capable of recognizing the QR code, the present disclosure can easily and accurately confirm the state of logistics products in the delivery vehicle by easily recognizing the QR code through the terminal without a complicated process so as to take necessary measures.

In addition, according to the problem solving means of the present disclosure, it is possible to simplify a procedure of confirming the state of the delivery vehicle, thereby enabling an integrated logistics products state management service to enhance efficiency, and minimizing the issuance of a number of paper certificates, such as authentication documents or examination reports which have to be submitted every time during distribution processes.

Furthermore, according to the problem solving means of the present disclosure, it is possible to efficiently link and manage information on a product on the basis of a QR code obtained during the production, distribution, and receiving processes of the product, thereby effectively integrating and managing data. In addition, it is possible to easily and effectively provide various information on the product through the linked data and to selectively utilize only information required according to the purpose.

Additionally, according to the problem solving means of the present disclosure, it is possible to integrally manage all data through just one server without needing to access separate servers for the production, distribution, and receiving processes of the product. Therefore, the present disclosure can easily provide information and increase information applicability. Furthermore, the present disclosure can provide an integrated logistics products service without performing additional manual work by performing automated data management with respect to the entire processes of production, distribution, and reception of the product.

The method according to an embodiment of the present disclosure can be implemented as a program (or application) to be executed by being combined with a computer which is hardware, and can be stored in a medium.

The program may include code coded as a computer language, such as C, C++, Java, machine language, etc. which a processor (CPU) of the computer can read through a device interface of a computer. The code may include a functional code associated with a function that defines necessary functions for executing the methods, and may include an execution procedure-related control code in which the processor of the computer needs to execute the functions according to predetermined procedures. In addition, the code may further include additional information necessary for the processor of the computer to execute the functions or memory reference-related code for whether the media should be referenced in which location (address) of the internal or external memory of the computer. Moreover, if communication with any other computer or server in a remote location is required to execute the functions by the process of the computer, the code may further include communication-related code for how to communicate with any other computer or server at a remote location using the communication module of the computer, or whether or not any information or media should be transmitted and received in the communication.

The method or algorithm described in relation to the embodiments of the present disclosure can be directly embodied in hardware, can be embodied in a software module executed by hardware, or can be embodied by combination thereof. The software module can be stored in a random access memory (RAM), a read-only memory (ROM), an erasable programmable read-only memory (EPROM), an electrically erasable programmable read-only memory (EEPROM), a flash memory, a hard disk, a detachable disk, a CD-ROM, or a medium readable by a computer, well-known in the technical field to which the present disclosure belongs.

The apparatus 10, the terminal 20, and the server 30 referred to herein include various devices capable of performing arithmetic processing to provide results to a user. For example, the server for providing an integrated logistics products management service according to the present disclosure may include all of a computer, a server device, and a portable terminal, or may adopt any one thereamong.

The computer may include, for example, a notebook computer equipped with a web browser, a desktop, a laptop, a tablet PC, a slate PC, and the like.

The server device is a server for processing information by performing communication with the external device, and includes an application server, a computing server, a database server, a file server, a game server, a mail server, a proxy server, a web server, and the like.

The portable terminal is a wireless communication device providing portability and mobility, and includes all kinds of handheld-based wireless communication devices, such as a personal communications system (PCS), a global system for mobile communications (GSM), a personal digital cellular (PDC), a personal handphone system (PHS), a personal digital assistant (PDA), an international mobile telecommunications (IMT)-2000, a code division multiple access (CDMA)-2000, a W-code division multiple access (W-CDMA), wireless broadband internet (WiBro) terminal, a smartphone, and the like, and a wearable device, such as a watch, a ring, a bracelet, an ankle bracelet, a necklace, glasses, contact lenses, or a head-mounted device (HMD).

On the other hand, the disclosed embodiments may be implemented in the form of a recording medium storing instructions executable by a computer. Instructions may be stored in the form of program code and, when executed by a processor, may generate a program module to perform the operation of the disclosed embodiments. The recording medium may be embodied as a computer-readable recording medium.

The computer readable recording medium includes all kinds of recording media in which instructions that can be decrypted by a computer are stored. For example, there may be a read-only memory (ROM), a random access memory (RAM), a magnetic tape, a magnetic disk, a flash memory, an optical data storage device, and the like.

The above description is only exemplary, and it will be understood by those skilled in the art that the disclosure may be embodied in other concrete forms without changing the technological scope and essential features. Therefore, the above-described embodiments should be considered only as examples in all aspects and not for purposes of limitation.

The invention claimed is:

1. A method for providing an electronic shipment certificate performed by a server providing an integrated logistics products management service, the method comprising operations of:
    obtaining a digital code including shipment information generated during a shipment process of a logistics product;
    obtaining a QR code generated through a device for measuring a delivery state during the delivery process of the logistics product;
    generating a random number, inserting the random number into the QR code, and transmitting the random number to an external terminal;
    linking shipment information included in the digital code, with delivery state information on the measured delivery state of the logistics product on the basis of the digital code and the QR code;
    receiving the random number from the external terminal, and comparing the random number received from the external terminal and the random number generated by the server, to determine whether to authenticate the external terminal;
    when the authentication of the external terminal is successful, providing the shipment information on the logistics product through the external terminal on the basis of the QR code displayed on a screen of an apparatus;
    when the authentication of the external terminal is failed, generating a re-authentication request signal of the authentication information, transmitting the re-authentication request signal to the external terminal, and when the authentication of the external terminal is failed beyond a predetermined number of times, generating a dummy QR code representing false information, and then, providing the dummy QR code to the external terminal,
    wherein the digital code includes a condition for a mean kinetic temperature (MKT) index that is an index depicting influences on the logistics product by calculating temperature changes progressed for a predetermined period of time as single temperature, and
    wherein the QR code includes sensing data measuring at least one among temperature, acceleration, humidity, illumination, inclination, impact, and location through a sensor of the apparatus during the delivery process of the logistics product; and
    determining whether the logistics product is delivered by satisfying the MKT index condition preset in the digital code based on the temperature change calculated through the QR code, to generate the electronic shipment certificate for the shipment information including signature information received from the external terminal.

2. The method according to claim 1, wherein the operation of providing shipment information of the logistics product comprises the operations of:
    recognizing the QR code displayed on the screen of the apparatus through the external terminal;
    determining whether to satisfy a predetermined condition for the logistics product based on the recognized QR code through the external terminal;

receiving signature information through the external terminal in a case of satisfying the predetermined condition; and generating an electronic shipment certificate for shipment information of the logistics product including the signature information, wherein the predetermined condition includes at least one of shipment conditions and delivery conditions for the logistics product.

3. The method according to claim 2, wherein at least one of the shipment conditions and the delivery conditions is preset as the predetermined condition, and wherein in operation of determining whether to satisfy a predetermined condition, it is determined whether to satisfy at least one of the shipment conditions and the delivery conditions preset in the digital code based on the sensing data included in the QR code.

4. The method according to claim 2, further comprising the operation of:

performing an authentication process for the external terminal in a case in which it is attempted to recognize the QR code displayed on the screen of the apparatus through the external terminal.

5. The method according to claim 4, wherein the operation of performing the authentication process comprises the operations of:

transmitting a request signal of authentication information to the external terminal on the basis of an authentication condition included in the QR code;

determining whether authentication is successful on the basis of authentication information received from the external terminal; and providing shipment information of the logistics product when the authentication is successful.

6. The method according to claim 5, wherein the authentication condition is preset in the QR code, and includes at least one among identification information, location information, time information, and user information for the external terminal, which is preset in the QR code.

7. The method according to claim 2, further comprising the operations of:

confirming authority information for the external terminal in a case in which it is attempted to recognize the QR code displayed on the screen of the apparatus through the external terminal; and providing a QR code corresponding to the authority information in the QR code on the basis of the authority information.

8. The method according to claim 7, wherein the authority information for the external terminal is confirmed based on at least one among identification information, location information, time information, and user information for the external terminal, further comprising the operations of:

providing a QR code region associated with signature information of a recipient through the external terminal if it is confirmed that the external terminal has authority information for the recipient; and providing a QR code region associated with an electronic shipment certificate through the external terminal in a case in which it is confirmed that manufacturer authority information for the external terminal is assigned.

9. A non-transitory computer-readable recording medium in which a program for carrying out the method for providing an electronic shipment certificate according to claim 1 is stored.

10. A server for providing an integrated logistics products management service, wherein the server:

obtains a digital code including shipment information generated during a shipment process of a logistics product;

obtains a QR code generated through a device for measuring a delivery state during the delivery process of the logistics product;

generates a random number, inserting the random number into the QR code, and transmitting the random number to an external terminal;

links shipment information included in the digital code, with delivery state information on the measured delivery state of the logistics product on the basis of the digital code and the QR code;

receives the random number from the external terminal, and compares the random number received from the external terminal and the random number generated by the server, to determine whether to authenticate the external terminal;

when the authentication of the external terminal is successful, provides the shipment information on the logistics product through the external terminal on the basis of the QR code displayed on a screen of an apparatus;

when the authentication of the external terminal is failed, generates a re-authentication request signal of the authentication information, transmits the re-authentication request signal to the external terminal, and when the authentication of the external terminal is failed beyond a predetermined number of times, generates a dummy QR code representing false information, and then, provides the dummy QR code to the external terminal;

wherein the digital code includes a condition for a mean kinetic temperature (MKT) index that is an index depicting influences on the logistics product by calculating temperature changes progressed for a predetermined period of time as single temperature, wherein the QR code includes sensing data measuring at least one among temperature, acceleration, humidity, illumination, inclination, impact, and location through a sensor of the apparatus during the delivery process of the logistics product; and determines whether the logistics product is delivered by satisfying the MKT index condition preset in the digital code based on the temperature change calculated through the QR code, to generate an electronic shipment certificate for the shipment information including signature information received from the external terminal.

11. The server according to claim 10, wherein when shipment information of the logistics product is provided, the server recognizes the QR code displayed on the screen of the apparatus through the external terminal, determines whether to satisfy a predetermined condition for the logistics product based on the recognized QR code through the external terminal, receives signature information through the external terminal in a case of satisfying the predetermined condition, and generates an electronic shipment certificate for shipment information of the logistics product including the signature information, and wherein the predetermined condition includes at least one of shipment conditions and delivery conditions for the logistics product.

12. The server according to claim 11, wherein at least one of the shipment conditions and the delivery conditions is preset as the predetermined condition, and wherein the server determines whether to satisfy at least one of the shipment conditions and the delivery conditions preset in the digital code based on the sensing data included in the QR code.

13. The server according to claim 11, wherein the server performs an authentication process for the external terminal in a case in which it is attempted to recognize the QR code displayed on the screen of the apparatus through the external terminal.

14. The server according to claim 13, wherein the server transmits a request signal of authentication information to the external terminal on the basis of an authentication condition included in the QR code when the authentication process is performed, determines whether authentication is successful on the basis of authentication information received from the external terminal, and provides shipment information of the logistics product when the authentication is successful.

15. The server according to claim 14, wherein the authentication condition is preset in the QR code, and includes at least one among identification information, location information, time information, and user information for the external terminal, which is preset in the QR code.

16. The server according to claim 11, wherein the server confirms authority information for the external terminal in a case in which it is attempted to recognize the QR code displayed on the screen of the apparatus through the external terminal, and provides a QR code corresponding to the authority information in the QR code on the basis of the authority information.

17. The server according to claim 16, wherein the authority information for the external terminal is confirmed based on at least one among identification information, location information, time information, and user information for the external terminal, and wherein the server provides a QR code region associated with signature information of a recipient through the external terminal if it is confirmed that the external terminal has authority information for the recipient, and provides a QR code region associated with an electronic shipment certificate through the external terminal in a case in which it is confirmed that manufacturer authority information for the external terminal is assigned.

\* \* \* \* \*